(12) United States Patent
Xiong et al.

(10) Patent No.: US 11,445,663 B2
(45) Date of Patent: Sep. 20, 2022

(54) DEVICE FOR PICKING FRUIT COMPRISING OVERLAPPING LOCATING MEMBERS

(71) Applicant: SAGA ROBOTICS AS, Oslo (NO)

(72) Inventors: Ya Xiong, Ås (NO); Pål Johan From, Ås (NO)

(73) Assignee: SAGA ROBOTICS AS, Oslo (NO)

( * ) Notice: Subject to any disclaimer, the term of this patent is extended or adjusted under 35 U.S.C. 154(b) by 0 days.

(21) Appl. No.: 16/969,485

(22) PCT Filed: Feb. 13, 2019

(86) PCT No.: PCT/EP2019/053598
§ 371 (c)(1),
(2) Date: Aug. 12, 2020

(87) PCT Pub. No.: WO2019/158610
PCT Pub. Date: Aug. 22, 2019

(65) Prior Publication Data
US 2020/0396900 A1 Dec. 24, 2020

(30) Foreign Application Priority Data
Feb. 13, 2018 (GB) ..................................... 1802335

(51) Int. Cl.
*A01D 46/253* (2006.01)
*A01D 46/30* (2006.01)
(52) U.S. Cl.
CPC ........... *A01D 46/253* (2013.01); *A01D 46/30* (2013.01)
(58) Field of Classification Search
CPC ...... A01D 46/253; A01D 46/30; A01D 46/22; A01D 46/24; A01D 46/247; A01D 46/243
See application file for complete search history.

(56) References Cited

U.S. PATENT DOCUMENTS 1,241,411 A * 9/1917 McNeill ............... A01D 46/247
56/333
1,246,173 A * 11/1917 Smith .................. A01D 46/247
56/334
(Continued)

FOREIGN PATENT DOCUMENTS

CN 101395989 A 4/2009
CN 202050707 U 11/2011
(Continued)

OTHER PUBLICATIONS

International Search Report (Form PCT/ISA/210) for International Application No. PCT/EP2019/053598 dated Apr. 4, 2019, 3 pages.
(Continued)

*Primary Examiner* — Adam J Behrens
*Assistant Examiner* — Madeline I Runco
(74) *Attorney, Agent, or Firm* — Withrow & Terranova, P.L.L.C.; Vincent K. Gustafson

(57) ABSTRACT

A device for picking a piece of fruit from a fruit plant. The device includes locating members arranged to be positioned around a piece of fruit to be picked. The locating members are actuatable from an open position to receive the piece of fruit between the locating members to a closed position to surround the stem by which the piece of fruit is attached to the fruit plant. The device also includes a mechanism for detaching the piece of fruit to be picked from the fruit plant. The mechanism is mounted on or relative to one or more of the plurality of locating members, and wherein the mechanism is arranged to detach the piece of fruit from the plant when the plurality of locating members are in the closed position.

17 Claims, 15 Drawing Sheets

(56) References Cited

U.S. PATENT DOCUMENTS

| | | | | |
|---|---|---|---|---|
| 2,017,983 | A * | 10/1935 | Mognet | A01D 46/247 56/334 |
| 2,288,682 | A * | 7/1942 | Chittenden | A01D 46/253 56/334 |
| 2,685,163 | A * | 8/1954 | Taylor | A01D 46/253 56/338 |
| 3,377,787 | A * | 4/1968 | Mccann | A01D 46/253 56/328.1 |
| 3,854,273 | A | 12/1974 | Rosenberg | |
| 3,857,227 | A * | 12/1974 | Rosenberg | A01D 46/247 56/335 |
| 4,519,193 | A | 5/1985 | Yoshida et al. | |
| 4,524,573 | A | 6/1985 | Kinney | |
| 4,663,925 | A * | 5/1987 | Terada | A01D 46/24 382/153 |
| 5,005,347 | A * | 4/1991 | Kedem | A01D 46/253 56/328.1 |
| 5,426,927 | A * | 6/1995 | Wang | A01D 46/24 56/328.1 |
| 5,471,827 | A * | 12/1995 | Janssen | A01G 18/70 56/13.1 |
| 6,009,186 | A | 12/1999 | Gorretta et al. | |
| 7,500,343 | B2 * | 3/2009 | Hsia | A01D 46/253 56/332 |
| 7,540,137 | B2 * | 6/2009 | Gray | B25J 5/005 56/328.1 |
| 7,810,305 | B2 * | 10/2010 | Macidull | A01D 46/247 56/334 |
| 8,306,663 | B2 * | 11/2012 | Wickham | A01D 46/30 700/259 |
| 8,381,501 | B2 * | 2/2013 | Koselka | A01D 46/30 56/10.2 A |
| 9,554,513 | B2 | 1/2017 | Pitzer | |
| 2010/0292841 | A1 | 11/2010 | Wickham | |
| 2011/0252760 | A1 | 10/2011 | Trinidad et al. | |
| 2015/0173297 | A1 | 6/2015 | Pitzer | |
| 2016/0073584 | A1 | 3/2016 | Davidson | |
| 2016/0089726 | A1 * | 3/2016 | Domeij | B25B 5/147 279/96 |
| 2016/0157431 | A1 | 6/2016 | Pitzer | |
| 2016/0309650 | A1 | 10/2016 | Jens et al. | |
| 2018/0146622 | A1 * | 5/2018 | Soetens | A01G 9/143 |
| 2020/0288636 | A1 * | 9/2020 | Kent | A01D 46/30 |
| 2021/0323174 | A1 * | 10/2021 | Salisbury | A01D 46/22 |

FOREIGN PATENT DOCUMENTS

| | | | |
|---|---|---|---|
| CN | 102441892 A | 5/2012 | |
| CN | 203197923 U | 9/2013 | |
| CN | 203860064 U | 10/2014 | |
| CN | 204131990 U | 2/2015 | |
| CN | 104690741 A | 6/2015 | |
| CN | 104206121 B | 3/2016 | |
| CN | 107258227 A | 10/2017 | |
| CN | 206760103 U | 12/2017 | |
| CN | 10771079 | 2/2018 | |
| CN | 107750643 A | 3/2018 | |
| CN | 207070639 U | 3/2018 | |
| CN | 107960205 A | 4/2018 | |
| CN | 108093868 A | 6/2018 | |
| CN | 207543655 U | 6/2018 | |
| CN | 108846862 A | 11/2018 | |
| CN | 208273615 U | 12/2018 | |
| CN | 109168601 A | 1/2019 | |
| CN | 109640621 A | 4/2019 | |
| DE | 3309185 C2 * | 3/1988 | A01D 46/253 |
| ES | 1204842 U | 2/2018 | |
| JP | 10229728 A * | 9/1998 | |
| JP | 2009027977 A | 2/2009 | |
| JP | 2010207118 A | 9/2010 | |
| JP | 2018030179 A | 3/2018 | |
| JP | 201997448 A | 6/2019 | |
| WO | 2010063075 A1 | 6/2010 | |
| WO | 2016055552 A1 | 4/2016 | |
| WO | 2016090012 A1 | 6/2016 | |
| WO | 2016123656 A1 | 8/2016 | |
| WO | 2016171789 A1 | 10/2016 | |
| WO | 2018015416 A1 | 1/2018 | |
| WO | 2018087546 A1 | 5/2018 | |
| WO | 2018167784 A1 | 9/2018 | |
| WO | 2019049130 A1 | 3/2019 | |
| WO | 2019158610 A1 | 8/2019 | |
| WO | 2019224627 A1 | 11/2019 | |
| WO | 2020058522 A2 | 3/2020 | |
| WO | 2021018854 A1 | 2/2021 | |

OTHER PUBLICATIONS

Written Opinion (Form PCT/ISA/237) for International Application No. PCT/EP2019/053598 dated Apr. 4, 2019, 6 pages.

Search Report under Section 17(5) for United Kingdom Patent Application No. GB1802335.8 dated Aug. 13, 2018, 4 pages.

Xiong et al "Design and Evaluation of a Novel Cable-Driven Gripper with Perception Capabilities for Strawberry Picking Robots", 2018 IEEE International Conference on Robotics and Automation (ICRA), Brisbane, QLD, 2018, pp. 7384-7391.

Hayashi et al "Evaluation of a strawberry-harvesting robot in a field test", Biosystems Engineering, vol. 105, Issue 2, Feb. 2010, pp. 160-171. Abstract Only. Retrieved from the Internet: <URL: https://www.sciencedirect.com/science/article/abs/pii/S1537511009002797?via%3Dihub>.

Kailiang et al "Synthesis design of a robot manipulator for strawberry harvesting in ridge-culture", Institute of Electrical and Electronics Engineers, 2016. Abstract Only. Retrieved from the Internet: <URL: https://ieeexplore.ieee.org/document/7556198>.

Liming et al "Automated strawberry grading system based on image processing", Computers and Electronics in Agriculture, vol. 71, Supplement 1, Apr. 2010, pp. S32-S39. Abstract Only. Retrieved from the Internet: <URL : https://www.sciencedirect.com/science/article/abs/pii/S016816990900204X>.

Sam et al "Design and feasibility tests of multi-functional gripper for handling variable shape of food products", 2010 IEEE International Conference on Systems, Man and Cybernetics, Istanbul, 2010, pp. 1267-1272. Abstract Only. Retrieved from the Internet: <https://ieeexplore.ieee.org/document/5642431>.

Search Report under Section 17(5) for United Kingdom Patent Application No. GB1910918.0, dated Jan. 31, 2020, 14 pages.

International Search Report (Form PCT/ISA/210) and Written Opinion (Form PCT/ISA/237) for International Application No. PCT/EP2020/071164, dated Oct. 8, 2020, 11 pages.

* cited by examiner

DEVICE FOR PICKING FRUIT COMPRISING OVERLAPPING LOCATING MEMBERS

This application is a 35 U.S.C. § 371 national phase filing of International Application No. PCT/EP2018/053598 filed on Feb. 13, 2019, and claims the benefit of United Kingdom Patent Application No. 1802335.8 filed on Feb. 13, 2018, wherein the disclosures of the foregoing applications are hereby incorporated by reference herein in their respective entireties.

The present invention relates to a device for picking fruit, in particular to an automated device for picking strawberries.

Soft fruit, such as strawberries, are high value crops which involve high production costs, particularly owing to the manual labour often involved. The manual picking of fruits introduces the risk of damaging the fruit as it is picked, which reduces the efficiency and profitability of the harvest.

Automated devices, e.g. robots, have been developed to harvest fruits, in the hope that production costs will be reduced and the production quality will be improved. However, the picking of fruit is a task that is not automated easily. First, soft fruit is particularly prone to being damaged and bruised when being harvested. Second, the harvesting of fruit, particularly strawberries, requires a highly selective process as they tend to grow and ripen unevenly, resulting in large variations in colour and size. In order to pick only ripe fruit, multiple harvesting passes may need to be made. Third, fruit such as strawberries tend to grow in clusters, making it difficult to identify and pick individual (e.g. ripe) fruit.

Automated devices developed thus far are not able to harvest fruit efficiently and reliably without damaging the fruit, owing to their inability to select and pick (e.g. ripe) fruit with the necessary level of care and attention. For example, US 2016/0157431 A1 discloses a two-fingered gripper that picks strawberries by gripping onto the stem and then pulling the stem to separate the strawberry from the plant. This action of the gripper is likely to damage the strawberry being picked and the strawberries remaining on the plant, from the recoil of the plant after the strawberry being picked has been separated from the plant.

Scissors-like cutters, e.g. as shown in CN 204131990 U, suffer from not being able to separate neighbouring pieces of fruit in a cluster from each other, owing to the difficulty in locating the position of the stem of the piece of fruit accurately. Thus such cutters may easily cut more than one stem at a time, thus unintentionally picking unripe pieces of fruit (e.g. as well as the intended, ripe piece of fruit). The aim of the present invention is to provide an improved device for picking fruit.

When viewed from a first aspect the invention provides a device for picking a piece of fruit from a fruit plant, wherein the piece of fruit is attached to the fruit plant by a stem, the device comprising:
  a plurality of locating members arranged to be positioned around a piece of fruit to be picked, wherein the plurality of locating members are actuatable from an open position to receive the piece of fruit between the plurality of locating members to a closed position to surround the stem by which the piece of fruit is attached to the fruit plant; and
  a mechanism for detaching the piece of fruit to be picked from the fruit plant, wherein the mechanism is mounted on or relative to one or more of the plurality of locating members, and wherein the mechanism is arranged to detach the piece of fruit from the plant when the plurality of locating members are in the closed position.

When viewed from a second aspect the invention provides a method of picking a piece of fruit from a fruit plant using the device of the first aspect of the invention, wherein the piece of fruit is attached to the fruit plant by a stem, the method comprising:
  actuating the plurality of locating members into the open position;
  positioning the device around a piece of fruit to be picked so that the plurality of locating members in the open position receive the piece of fruit between the plurality of locating members;
  actuating the plurality of locating members into the closed position to surround the stem by which the piece of fruit is attached to the fruit plant; and
  operating the mechanism when the plurality of locating members are in the closed position to detach the piece of fruit from the fruit plant.

The present invention provides a device for picking a piece of fruit that is attached to a fruit plant by a stem, such that the piece of fruit is removed from the fruit plant for harvesting. The device includes multiple locating members that are able to be actuated between an open position and a closed position. The locating members are arranged to be positioned around a piece of fruit, thus selecting the piece of fruit to be picked from the fruit plant. In the open position, the piece of fruit is received between the locating members, e.g. such that the locating members surround the piece of fruit. In the closed position the locating members (are, e.g., moved closer together to) surround the stem of the piece of fruit. Thus, for example, in the closed position at least part of the locating members are positioned between the piece of fruit and the fruit plant.

The device also includes a mechanism (e.g. a cutter) for detaching the piece of fruit from the fruit plant (e.g. by cutting the stem of the piece of fruit to be picked). The detaching mechanism is mounted on or relative to one (or more) of the locating members and is arranged to be operable to detach the piece of fruit to be picked from the fruit plant when the locating members are in the closed position. Thus it will be appreciated that by separating the locating function of the locating members (which first surround and locate a piece of fruit to be picked, positioning themselves around the piece of fruit in their open position and then moving into their closed position to surround the stem) from the detaching function of the mechanism, the device of the present invention is less likely to damage the piece of fruit when it is being picked. This contrasts with conventional fruit pickers having grippers that both select and separate the piece of fruit from the fruit plant, e.g. as shown in US 2016/0157431 A1. Such grippers are prone to bruising both the piece of fruit being picked and the remaining neighbouring pieces of fruit on the plant, owing to the force needed to pull the piece of fruit away from the fruit plant.

Furthermore, the plurality of locating members of the device according to the present invention help to carefully separate out a single piece of fruit from a cluster of pieces of fruit (e.g. by separating berries or fruit in a cluster on a strawberry plant). Thus, for example, when picking a strawberry that has been identified to be picked from a strawberry plant, the device is able to use the locating members to push aside surrounding leaves, other strawberries and obstacles when moving towards the strawberry to be picked, thus helping to enable the device to separate a strawberry to be picked from a cluster of strawberries. This helps to only detach pieces of fruit from the plant that have been identified as being ripe and not to detach unripe pieces of fruit accidentally at the same time.

The locating members also help to position the stem of the piece of fruit (which may be difficult to detect, e.g. on a strawberry plant) as they move to their closed position, such that the stem is in the correct position to be detached by the detachment mechanism. This helps to overcome the difficulties that conventional scissor-like cutters (e.g. as shown in CN 204131990 U) have in separating a piece of fruit from neighbouring pieces of fruit in a cluster, e.g. owing to the difficulty in locating the position of the stem of the piece of fruit. With such conventional scissor-like cutters, it is very easy to cut more than one stem at a time, thus unintentionally picking unripe pieces of fruit (e.g. as well as the intended, ripe piece of fruit).

The device may be arranged to pick suitable and desired type of fruit that is attached to (e.g. hangs from) a fruit plant by a stem, e.g. apples, pears, oranges, etc. Owing to the ability of the device, at least in preferred embodiments, to handle fruit carefully when harvesting, the device is particularly suited (and in embodiments is arranged) to pick soft fruit, e.g. strawberries, raspberries, tomatoes, etc.

In a preferred embodiment the device is arranged to pick pieces of fruit that grow in clusters on a plant, e.g. strawberries, raspberries, tomatoes, etc.

The device may be operated or controlled by an operator. However, preferably the device is semi or fully automated. Thus, for example, the device may operate autonomously or semi-autonomously.

The locating members may be arranged in any suitable and desired way so that they can be positioned around a piece of fruit to be picked. In a preferred embodiment the plurality of locating members are arranged in a (e.g. closed) ring. This helps to enable the locating members to be positioned around (e.g. surround) a piece of fruit to be picked. When the pieces of fruit (e.g. strawberries) grow in clusters, this helps to isolate the piece of fruit to be picked from neighbouring pieces of fruit.

Preferably the plurality of locating members are mounted to a frame or body of the device. Preferably the plurality of locating members are mounted to a frame or body of the device by a plurality of hinges respectively (i.e. preferably each locating member is attached to a frame or body of the device by a respective hinge).

Preferably the plurality of locating members (e.g. each) comprise a proximal end (e.g. hingedly attached to the (e.g. frame or body of the) device) and a distal end that is remote from the (e.g. frame or body of the) device.

The plurality of locating members may have any suitable and desired shape. Preferably the plurality of locating members (e.g. each) comprise a (e.g. thin) locating plate (e.g. having dimensions in two (e.g. perpendicular) directions (e.g. a height and a width) that are (e.g. significantly greater) than the dimension in a third (e.g. mutually perpendicular) direction (e.g. a depth or thickness)).

Preferably the height of (e.g. each of) the plurality of locating members is greater than or equal to the width of (e.g. each of) the plurality of locating members. Preferably the width of (e.g. each of) the plurality of locating members is in a direction along which it is mounted to a frame or body of the device (e.g. along the direction of the hinge). Preferably the height of (e.g. each of) the plurality of locating members is in a direction from the proximal end to the distal end.

Preferably (e.g. each of) the plurality of locating members are curved (e.g. a curved plate). For example, when the plurality of locating members are arranged in a (e.g. closed) ring, preferably the concave side of (e.g. each of) the locating member(s) faces inwards. Preferably, when the plurality of locating members are arranged in a (e.g. closed) ring, the smallest (e.g. thinnest) dimension of (e.g. each of) the plurality of locating members is in a radial direction relative to the ring (e.g. when the plurality of locating members are in their open position).

Preferably (e.g. each of) the plurality of locating members is curved in a direction from the proximal end to the distal end. Preferably (e.g. each of) the plurality of locating members is curved in a direction along which it is mounted to a frame or body of the device (e.g. along the direction of the hinge).

Preferably the (e.g. each of) the plurality of locating members is wider (e.g. in a direction along which it is mounted to a frame or body of the device (e.g. along the direction of the hinge)) at its proximal end than at its distal end.

The device may comprise any suitable and desired number of locating members. In one embodiment the device comprises at least four, e.g. six, locating members.

Preferably (e.g. each of) the plurality of locating members (e.g. at least partially) overlap with others of the plurality of locating members (e.g. at least in their closed position). Preferably (e.g. each of) the plurality of locating members (e.g. at least partially) overlap with others of the plurality of locating members in their open position.

Preferably (e.g. each of) the plurality of locating members overlaps with their adjacent locating member. Preferably (e.g. each of) the plurality of locating members comprises one or more truncated distal corners. This helps (e.g. adjacent of) the plurality of locating members to overlap with each other.

Preferably the plurality of locating members comprises a plurality of inner locating members and a plurality of outer locating members, e.g. arranged alternately, e.g. in a ring. For example, when the plurality of locating members are arranged in a ring, preferably the (e.g. alternate) inner locating members are located radially inwards of the outer locating members. Preferably (e.g. each of) the plurality of outer locating members (e.g. at least partially) overlaps with (e.g. the adjacent of) the plurality of inner locating members.

Preferably (e.g. each of) the plurality of the outer locating members has one or more greater dimensions (e.g. height and/or width) than corresponding one or more dimensions of the (e.g. each of) the plurality of the inner locating members. This helps the inner locating members to fit between the outer locating members, particularly when the plurality of locating members are actuated to their closed position, and particularly when the plurality of locating members are arranged in a ring.

The plurality of locating members may be any suitable and desired size, e.g. depending on the type of fruit they are to be used to pick. When the plurality of locating members are in the open position, preferably the aperture defined by the (e.g. distal ends of the) plurality of locating members is has a (e.g. minimum) dimension that is greater than the (e.g. maximum) size of the piece of fruit to be picked.

When the plurality of locating members are in the closed position, preferably the (e.g. distal ends of the) plurality of locating members define an aperture that is smaller than the size of the piece of fruit to be picked (but greater than the width of the stem of the piece of fruit to be picked). Thus preferably the aperture defined between the plurality of locating members in the open position is larger (e.g. has a greater area) than the aperture defined between the plurality of locating members in the closed position.

Preferably in the closed position the plurality of locating members are arranged to surround the stem between the piece of fruit and the fruit plant. When the plurality of locating members are actuated into the closed position, preferably one or more of the locating members are arranged to centre the stem of the piece of fruit to be picked between the (e.g. distal ends of the) plurality of locating members (e.g. as the aperture defined by the plurality of locating members is reduced in size), e.g. so that the stem is in the correct position to be detached by the detachment mechanism. This helps to eliminate any errors in the localisation of the strawberry, for example.

The plurality of locating members are actuatable between the open position and the closed position, and preferably vice versa (i.e. between the closed position and the open position). The plurality of locating members may be actuated in any suitable and desired way. Preferably the device comprises an (e.g. automated) actuation mechanism arranged to actuate the plurality of locating members between the closed position and the open position (and, e.g., vice versa). Preferably the actuation mechanism is active (e.g. driven).

Preferably the device comprises a return mechanism arranged to actuate the plurality of locating members between the open position and the closed position. Preferably the return mechanism is passive (e.g. uses an amount of stored potential energy).

Thus, in a particularly preferred embodiment the actuation mechanism is arranged to actuate the plurality of locating members between the closed position and the open position so that the plurality of locating members in their open position may be positioned around a piece of fruit to be picked, and then the return mechanism is arranged (e.g. by releasing or reversing the (e.g. active) actuation mechanism) to actuate the plurality of locating members between the open position and the closed position (e.g. to allow the plurality of locating members to return (e.g. passively) to the closed position) so that the plurality of locating members may be positioned around the stem of the piece of fruit to be picked.

The actuation mechanism may actuate (e.g. drive) each of the plurality of locating members. However, in a preferred embodiment, the plurality of locating members comprises one or more active (e.g. driven) locating members and one or more passive locating members. Preferably the one or more active locating members are arranged to actuate the one or more passive locating members between the closed position and the open position (and, e.g., vice versa).

Thus preferably the one or more active locating members are connected (e.g. mechanically) to the one or more passive locating members. This may simply be that the one or more passive locating members are in contact with the one or more active locating members (e.g. owing to an overlap therebetween), such that when the one or more active locating members are actuated, they push against the one or more passive locating members to actuate the plurality of locating members between the closed position and the open position.

Preferably the actuation mechanism is arranged (e.g. coupled) to act on (e.g. actuates) (e.g. each of) the one or more active locating members (e.g. to actuate the one or more active locating members between the closed position and the open position). When the plurality of locating members comprises inner and outer locating members, preferably (e.g. each of) the inner locating members comprise active locating members. Preferably (e.g. each of) the outer locating members comprise passive locating members.

The actuation mechanism may comprise any suitable and desired mechanism to actuate the plurality of locating members. In a preferred embodiment the actuation mechanism comprises a cable driven mechanism. It will be appreciated that a cable driven mechanism is compact and the cables can be routed down the side of the device, for example. This thus minimises the space that is occupied by the actuation mechanism in the vicinity of the locating members and therefore helps to maximise the space available for picking (and, e.g., storing) the pieces of fruit. A cable driven mechanism is also lightweight.

Preferably the device comprises one or more cables that are (e.g. each) attached to one or more of the (e.g. active) locating members (e.g. respectively), wherein the one or more cables are arranged (e.g. driven) to actuate the plurality of locating members between the closed position and the open position. Preferably the device comprises a (e.g. servo) motor arranged to drive (e.g. pull) the one or more cables to actuate the plurality of locating members. Preferably the motor is arranged to drive the one or more cables synchronously (i.e. together). Thus only a single motor may be required when the device includes multiple cables.

The return mechanism may comprise any suitable and desired mechanism to actuate the plurality of locating members between the open position and the closed position. Preferably the return mechanism comprises a biasing mechanism arranged to bias the plurality of locating members into the closed position. Preferably the actuation mechanism is arranged to act against the (return) biasing mechanism when the actuation mechanism actuates the plurality of locating members between the closed position and the open position. Thus preferably when the actuation mechanism is released, the return mechanism acts (e.g. automatically) to return the plurality of locating members from the open position to the closed position.

Preferably the return (biasing) mechanism comprises one or more (e.g. tension and/or torsion) springs arranged to bias the plurality of locating members into the closed position. Preferably the one or more (e.g. tension) springs are connected between the plurality of locating members and wherein the one or more springs are arranged to be extended when the plurality of locating members are actuated into the open position. Preferably the one or more (e.g. torsion) springs are connected between (e.g. each of) the plurality of (e.g. active) locating members and the respective parts of the device on which the plurality of locating members are mounted, and wherein the one or more springs are arranged to be rotated when the plurality of locating members are actuated into the open position. For example, the hinges that mount the plurality of (e.g. active) locating members respectively may each comprise a (e.g. torsion) spring. Preferably the spring force of the one or more springs increases when the plurality of locating members are actuated into the open position (e.g. as the one or more springs are extended or rotated, as appropriate).

Preferably the one or more springs are connected between (e.g. each of) the (e.g. adjacent) active and passive locating members. Thus preferably the actuation mechanism acts on the active locating members against the biasing (e.g. spring) force of the biasing mechanism (e.g. one or more springs) to move both the active and passive locating members into the open position. Preferably the biasing (e.g. spring) force of the biasing mechanism (e.g. one or more springs) then acts to move both the active and passive locating members into the closed position (e.g. when the actuation mechanism is released).

The mechanism for detaching the piece of fruit to be picked from the fruit plant may comprise any suitable and desired detachment mechanism. Preferably the mechanism is arranged to detach the piece of fruit by breaking (e.g. snapping or cutting) the stem of the piece of fruit which attaches it to the fruit plant.

The detachment mechanism may comprise an integral part of (e.g. may be integrally mounted to) one or more of the plurality of locating members. For example, one or more of the plurality of locating members may comprise a blade (e.g. formed as a sharpened (distal) edge of one or more of the locating members) for detaching the piece of fruit from the plant.

When the (e.g. integral) detachment mechanism is actuated to detach the piece of fruit from the fruit plant, this may be a continuation of the actuation (for one or more) of the plurality of locating members into the closed position. For example, one or more of the plurality of locating members may be (further) actuated to snap or cut (e.g. using one or more of the ends of the locating members as "finger nails") the stem of the piece of fruit to be picked when the plurality of locating members are in the closed position (when they surround the stem of the piece of fruit to be picked). Thus the detachment mechanism (e.g. comprising the ends of one or more of the locating members) may be actuated to detach the piece of fruit from the fruit plant by the same actuation mechanism used for actuating the plurality of locating members (e.g. into the closed position).

However, in one set of embodiments, the detachment mechanism comprises a separate component that is mounted on (e.g. attached to) or relative to one (or more) of the locating members. Providing a separate detachment mechanism further helps to separate the movement of the locating members to locate the piece of fruit to be picked from the action of the detachment mechanism to detach the piece of fruit from the fruit plant.

Preferably the detachment mechanism is arranged to be moved into a detaching position for detaching the piece of fruit when the plurality of locating members are or have been moved into the closed position. Preferably the detachment mechanism is arranged to detach the piece of fruit from the plant when the detachment mechanism has been moved into the detaching position.

Thus preferably the method comprises moving the detachment mechanism into the detaching position when the plurality of locating members are or have been moved into the closed position. Preferably the method also comprises actuating the detachment mechanism when the detachment mechanism is in the detaching position to detach the piece of fruit from the fruit plant.

In these embodiments, it will be seen that in order to be able to detach the piece of fruit from the fruit plant, the mechanism is arranged to be moved into a detaching position for detaching the piece of fruit from the fruit plant when the plurality of locating members are or have been moved into the closed position (and, for example, the mechanism is arranged to be actuated to detach the piece of fruit while the mechanism is in the detaching position).

The (e.g. separate) detachment mechanism may, for example, comprise a blade, a heating (e.g. burning or singeing) element, a laser, a wire or thread, or any other suitable component for detaching the piece of fruit to be picked from the fruit plant (e.g. by cutting its stem).

In a preferred embodiment the detachment mechanism comprises a cutter for cutting the stem of the piece of fruit to be picked. Thus preferably the device comprises a cutter for cutting the stem of the piece of fruit to be picked when the plurality of locating members are in the closed position, wherein the cutter is mounted on or relative to one of the plurality of locating members, and wherein the cutter is arranged to be moved into a cutting position for cutting the stem of the piece of fruit when the plurality of locating members are or have been moved into the closed position, e.g. when the cutter has been moved into the cutting position.

The cutter may comprise any suitable and desired type of cutter for cutting the stem of the piece of fruit to be picked. In a preferred embodiment the cutter comprises a blade, e.g. a pair of opposing (e.g. curved) blades. Preferably the blade, e.g. one or both of the pair of blades, is rotatable (e.g. for cutting the stem of the piece of the fruit). Preferably the cutter comprises a gear mechanism (e.g. a pair of meshing gears) arranged to rotate the blade, e.g. one or both of the pair of blades. Preferably the blade, e.g. one or both of the pair of blades, is mounted on a (respective) gear of the gear mechanism (e.g. the pair of blades is mounted on the pair of meshing gears respectively). Thus preferably the cutter is mounted on or relative to one of the plurality of locating members by the gear mechanism.

The detachment mechanism may be mounted on or relative to one (or more) of the plurality of locating members in any suitable and desired way. Preferably the detachment mechanism is mounted on or relative to an inner (e.g. concave) surface of one of the plurality of locating members. Preferably one or more of the plurality of locating members is arranged to shield the detachment mechanism (e.g. the cutter) from the piece of fruit to be picked.

For example, preferably the detachment mechanism (e.g. the cutter) does not project beyond the distal end of the locating member that it is mounted on or relative to, e.g. when the detachment mechanism (e.g. the cutter) is not being used to detach (e.g. cut the stem of) the piece of fruit (e.g. when the plurality of locating members are being actuated between the open and closed positions (and, e.g., vice versa)). This helps to protect the piece of fruit to be picked from the detachment mechanism (e.g. the cutter), thus helping to minimise the damage to the piece of fruit during harvesting.

Preferably the detachment mechanism (e.g. the cutter) is mounted on or relative to an active (e.g. driven) locating member.

The detachment mechanism (e.g. cutter) may be arranged to be moved into the detaching (e.g. cutting) position (such that it is positioned to (e.g. be ready to) detach (e.g. cut the stem of) the piece of fruit which the plurality of locating members surround) in any suitable and desired way. In a preferred embodiment, the detachment mechanism is arranged to be moved into the detaching position by (e.g. synchronised with) the one of the plurality of locating members being actuated from the open position to the closed position. Preferably this is owing to the way the detachment mechanism is mounted on or relative to the locating members. For example, when the detachment mechanism is mounted on one (or more) of the plurality of locating members, the detachment mechanism moves into the detaching position as the locating member(s) are moved into the closed position.

Preferably the plurality of locating members are actuated between the open position and the closed position (and, e.g., vice versa) by the same mechanism (e.g. the return and/or actuation mechanism, as appropriate) that moves the detachment mechanism (e.g. cutter) into the detaching (e.g. cutting) position, e.g. the detachment mechanism is moved into the detaching position by the return (and/or the actuation) mechanism that actuates the plurality of locating members. However, preferably the detachment mechanism (e.g. cutter) and the locating member(s), on or relative to which the detachment mechanism (e.g. cutter) is mounted, comprise separate components (i.e. preferably the detachment mechanism (e.g. cutter) is not simply a part of the locating member).

Preferably the plurality of locating members are arranged not to (and, e.g., are not capable of) cut the stem of the piece of fruit. This may be owing to them having a blunt distal end and/or them forming an aperture that has a greater minimum dimension than the thickness of the stem of the piece of fruit to be picked when the plurality of locating members are in the closed position.

Preferably the detachment mechanism (e.g. cutter) is arranged to be operated (e.g. actuated) while in the detaching (e.g. cutting) position to detach (e.g. cut the stem of) the piece of fruit to separate the piece of fruit from the fruit plant. Preferably the detachment mechanism (e.g. cutter) is arranged to be operated (e.g. actuated) to detach (e.g. cut the stem of) the piece of fruit to be picked when the plurality of locating members are in the closed position.

When the detachment mechanism comprises a cutter, preferably the cutter (e.g. one or more of the cutter blades) is actuatable between an open configuration (e.g. arranged to receive the stem of the piece of fruit) and a closed configuration (e.g. arranged to cut the stem of the piece of fruit). Preferably the cutter is arranged to be moved into the cutting position (e.g. to be ready to then cut the stem of the piece of fruit) in its open configuration, e.g. such that the cutter does not project beyond the distal end of the locating member that it is mounted on or relative to while the plurality of locating members are being actuated between open position and the closed position.

Preferably the cutter is only able to be actuated between the open configuration and the closed configuration when the plurality of locating members are in the closed position. In other words, for example, the detachment mechanism (e.g. cutter) is prevented from being operated (e.g. actuated) to detach (e.g. cut the stem of) the piece of fruit (e.g. prevented from being actuated from the open configuration to the closed configuration) when the plurality of locating members are not in the closed configuration (e.g. when the plurality of locating members are in the open position or being moved into the closed position). This helps to protect the piece of fruit from the detachment mechanism (e.g. cutter) while the device is being positioned around the piece of fruit.

The cutter may be actuated to cut the stem of the piece of fruit to be picked in any suitable and desired way. Preferably the device comprises a cutter actuation mechanism arranged to actuate the (e.g. blade(s) of the) cutter (between the open configuration and the closed configuration) to cut the stem of the piece of fruit to be picked.

The cutter actuation mechanism may comprise any suitable and desired mechanism to actuate the (e.g. blade(s) of the) cutter (between the open configuration and the closed configuration) to cut the stem of the piece of fruit to be picked. In a preferred embodiment the cutter actuation mechanism (or the detachment mechanism) comprises a cable driven mechanism. It will be appreciated that a cable driven mechanism is compact and the cable can be routed down the side of the device, for example. This thus minimises the space that is occupied by the cutter actuation or detachment mechanism in the vicinity of the detachment mechanism (e.g. cutter) and therefore helps to maximise the space available for picking (and, e.g., storing) the pieces of fruit. A cable driven mechanism is also lightweight.

Preferably the cable for the cutter actuation or detachment mechanism is arranged alongside the cable(s) of the cable driven mechanism for the locating members. Again, this helps to minimise the space that is occupied by the actuation mechanisms in the device.

Preferably the cutter actuation or detachment mechanism comprises a cable that is attached to the detachment mechanism (e.g. cutter) (e.g. attached to the gear mechanism, e.g. to one or both of the pair of meshing gears), e.g. wherein the cable is arranged (e.g. driven) to actuate the cutter between the open configuration and the closed configuration. Preferably the device comprises a (e.g. servo) motor arranged to drive (e.g. pull) the cable to actuate the detachment mechanism (e.g. cutter).

As has been alluded to above, preferably the actuation of the plurality of locating members and the actuation of the detachment mechanism (e.g. cutter) (e.g. when it is in the detaching (e.g. cutting) position) are two separate (e.g. independent) actuations. Thus preferably first the plurality of locating members are arranged to be actuated into the closed position (and the detachment mechanism (e.g. cutter) into the detaching (e.g. cutting) position) and then the detachment mechanism (e.g. cutter) is arranged to be operated (e.g. actuated) to detach (e.g. cut the stem of) the piece of fruit to be picked (e.g. only when the plurality of locating members are in the closed position).

Preferably the actuation mechanism for the plurality of locating members and the cutter actuation or detachment mechanism are driven by the same motor.

Preferably the separation of the actuations of the plurality of locating members and the detachment mechanism (e.g. cutter) is implemented by the motor being driven in one direction to drive the actuation mechanism for the plurality of locating members (to actuate the plurality of locating members, e.g. from the closed position to the open position) and in the opposite direction to drive the cutter actuation or detachment mechanism (to actuate the (e.g. blade(s) of the) cutter), e.g. after the return mechanism has actuated the plurality of locating members from the open position to the closed position.

Thus preferably when the motor is energised to drive the cutter actuation or detachment mechanism to operated (e.g. actuate) the detachment mechanism (e.g. cutter), the actuation mechanism for the plurality of locating members is not driven, e.g. such that the plurality of locating members remain in the closed position (e.g. under the bias of the return mechanism) while the detachment mechanism (e.g. cutter) is being operated (e.g. actuated). Similarly, when the motor is energised to drive the actuation mechanism for the plurality of locating members, preferably the cutter actuation or detachment mechanism is not driven, e.g. such that the cutter remains in the open configuration (e.g. under the bias of the return mechanism) while the plurality of locating members are being actuated.

Preferably the motor is arranged to be driven in a first direction to drive the actuation mechanism for the plurality of locating members (to actuate the plurality of locating members, e.g. from the closed position to the open position), and the motor is arranged to be driven in a second, opposite direction (to the first direction) to drive the cutter actuation or detachment mechanism (to actuate the (e.g. blade(s) of the) cutter), e.g. after the return mechanism has actuated the plurality of locating members from the open position to the closed position. This helps to minimise the space occupied by the actuation mechanisms in the device, e.g. to maximise the space for picking and, e.g., storing strawberries.

When the actuation mechanism for the plurality of locating members and the cutter actuation or detachment mechanism comprise cables driven by the motor to actuate the plurality of locating members and the detachment mechanism (e.g. cutter) respectively, preferably the motor is arranged to rotate in a first direction to drive the one or more cables to actuate the plurality of locating members (e.g. from the closed position to the open position) and the motor is arranged to rotate in a second, opposite direction (to the first direction) to drive the cable to actuate the detachment mechanism (e.g. cutter), e.g. after the return mechanism has actuated the plurality of locating members from the open position to the closed position.

It will be appreciated that using the (same) motor in this way to drive the actuation mechanism for the plurality of locating members and the cutter actuation or detachment mechanism (by energising the motor in opposite directions to drive these different actuation mechanisms), means that, in at least preferred embodiments, the detachment mechanism (e.g. cutter) and the plurality of locating members are actuated independently of each other. Furthermore, preferably the cutter is actuated into the open configuration before the plurality of locating members are (e.g. able to be) actuated (such that the plurality of locating members are only able to be actuated when the cutter is in the open configuration). Similarly, preferably the plurality of locating members are actuated into the closed configuration before the detachment mechanism (e.g. cutter) is (e.g. able to be) actuated (such that the detachment mechanism (e.g. cutter) is only able to be operated (e.g. actuated) when the plurality of locating members are in the closed configuration).

Preferably the device comprises a cutter return mechanism arranged to actuate the cutter between the closed configuration and the open configuration, e.g. before the plurality of locating members are arranged to be actuated from the closed position to the open position. Preferably the cutter return mechanism is passive (e.g. uses an amount of stored potential energy).

Thus, in a particularly preferred embodiment the cutter actuation mechanism is arranged to actuate the (e.g. blade(s) of the) cutter from the open configuration to the closed configuration so that the cutter may cut the stem of a piece of fruit to be picked, and then the return mechanism is arranged (e.g. by releasing or reversing the (e.g. active) actuation mechanism) to actuate the (e.g. blade(s) of the) cutter between the closed configuration and the open configuration (e.g. to allow the (e.g. blade(s) of the) cutter) to return (e.g. passively) to the open configuration) so that the cutter may be positioned ready to cut the stem of another piece of fruit or, e.g., shielded by the locating member when the plurality of locating members are actuated to the open position to receive another piece of fruit to be picked.

The cutter return mechanism may comprise any suitable and desired mechanism to actuate the cutter between the closed configuration and the open configuration. Preferably the cutter return mechanism comprises a biasing mechanism arranged to bias the cutter into the open configuration. Preferably the cutter actuation mechanism is arranged to act against the cutter (return) biasing mechanism when the cutter actuation mechanism actuates the cutter between the open configuration and the closed configuration. Thus preferably when the cutter actuation mechanism is released, the cutter return mechanism acts (e.g. automatically) to return the cutter from the closed configuration and the open configuration.

Preferably the cutter return (biasing) mechanism comprises one or more (e.g. tension) springs arranged to bias the cutter into the open configuration. Preferably the one or more springs are connected between the cutter (e.g. the gear mechanism, e.g. one or both of the pair of meshing gears) and the locating member on or relative to which the cutter is mounted, and wherein the one or more springs are arranged to be extended when the cutter is actuated into the closed configuration. Preferably the spring force of the one or more springs increases when the cutter is actuated into the closed configuration (e.g. as the one or more springs are extended).

In a particularly preferred embodiment, when the cutter comprises a pair of meshing gears, the cutter actuation mechanism acts on one of the meshing gears in the pair and the cutter return mechanism acts on the other of the meshing gears in the pair.

Preferably the device comprises a container (e.g. a hollow volume) for receiving and storing the piece of fruit that has been picked (after the detachment mechanism (e.g. cutter) has detached the piece of fruit (e.g. cut the stem) from the fruit plant). Providing a container allows the device to pick multiple pieces of fruit consecutively without having to return to a collecting tray, for example. This reduces the (e.g. average) time taken to pick a piece of fruit and the distance that the device has to travel to pick pieces of fruit.

This is considered to be novel and inventive in its own right and thus when viewed from a further aspect the invention provides a device for picking a piece of fruit from a fruit plant, the device comprising:

a mechanism for detaching the piece of fruit to be picked from the fruit plant; and a container for receiving and storing the piece of fruit that has been picked, wherein the container is positioned relative to the mechanism such that when the piece of fruit is detached from the fruit plant, the piece of fruit is received by the container.

This aspect of the invention may (and preferably does) comprise one or more (e.g. all) of the preferred and optional features of the other aspects of the invention outlined herein. For example, preferably the device comprises a plurality of locating members arranged to be positioned around a piece of fruit to be picked, wherein the plurality of locating members are actuatable from an open position to receive the piece of fruit between the plurality of locating members to a closed position to surround the stem by which the piece of fruit is attached to the fruit plant. Preferably the detachment mechanism is mounted on or relative to one or more of the plurality of locating members, and wherein the mechanism is arranged to detach the piece of fruit from the plant when the plurality of locating members are in the closed position.

The container may be any suitable and desired size. In a preferred embodiment the container is arranged to store at least 4 strawberries, e.g. at least 7 strawberries, e.g. at least 10 strawberries, depending on the size of the strawberries (which in turn may depend on the variety of the strawberries, or other fruit being picked).

Preferably the container is arranged to catch the piece of fruit when the piece of fruit is detached from the fruit plant (e.g. when the stem of the piece of fruit is cut). Thus preferably the container is arranged below the detachment mechanism (e.g. cutter).

The container could be removable (e.g. a standard fruit basket that is then used for transporting and selling the picked fruit). This may allow the device to pick fruit that is then collected in the container, and the container can then be placed (e.g. by moving the device) into a crate for storage and onward transportation. The removable container could be attached to the (e.g. frame or body of the) device by a clamping mechanism, e.g. that can pick up a (e.g. empty) container and then release the (e.g. full) container.

However, preferably the plurality of locating members are mounted on the (e.g. top of the) container. Thus preferably the container comprises an integral part of the device. In other words, preferably the body on which the plurality of locating members are mounted comprises a (e.g. integral) container.

Preferably the (e.g. integral) container comprises a (e.g. inclined) board positioned above the base of the container to break the fall of a piece of fruit that has been picked. This helps to minimise the damage to the piece of fruit as it falls into the container after having been picked. Preferably the board is cushioned, e.g. comprises a sponge (outer) layer.

Preferably the container comprises a trapdoor arranged to be opened to dispense the piece(s) of fruit that have been picked by the device. The trapdoor may be opened (and, e.g., closed) in any suitable and desired way. In a preferred embodiment the device comprises a trapdoor actuation mechanism arranged to open (and, e.g., close) the trapdoor.

The trapdoor actuation mechanism may comprise any suitable and desired actuation mechanism. In a preferred embodiment the trapdoor actuation mechanism comprises a (e.g. rotating) cam arranged to open the trapdoor. Preferably the cam is actuated (e.g. rotated) by a motor. Thus preferably the device comprises a (e.g. cam) motor arranged to drive the trapdoor actuation mechanism. Preferably the (e.g. cam) motor is a separate (e.g. different) motor from the motor arranged to drive the actuation mechanism for the plurality of locating members and/or the cutter actuation or detachment mechanism.

Preferably the device comprises a trapdoor return mechanism arranged to close the trapdoor. Preferably the trapdoor return mechanism is passive (e.g. uses an amount of stored potential energy).

The trapdoor return mechanism may comprise any suitable and desired mechanism to close the trapdoor. Preferably the trapdoor return mechanism comprises a biasing mechanism arranged to bias the trapdoor closed. Preferably the trapdoor actuation mechanism is arranged to act against the trapdoor (return) biasing mechanism when the trapdoor actuation mechanism opens the trapdoor. Thus preferably when the trapdoor actuation mechanism is released, the trapdoor return mechanism acts (e.g. automatically) to close the trapdoor.

Preferably the trapdoor return (biasing) mechanism comprises one or more (e.g. tension) springs arranged to bias the trapdoor closed. Preferably the one or more springs are connected between the trapdoor and the container, and wherein the one or more springs are arranged to be extended when the trapdoor is opened. Preferably the spring force of the one or more springs increases when the trapdoor is opened (e.g. as the one or more springs are extended).

The device may be positioned relative to the piece of fruit to be picked in any suitable and desired way. In a preferred embodiment the device comprises an (e.g. robotic) arm arranged to manipulate the position of the (e.g. locating members and detachment mechanism (e.g. cutter) of the) device to allow it to pick a piece of fruit. Preferably the arm is attached to the frame or body of the device, e.g. to the container. In other words, preferably the plurality of locating members and the detachment mechanism (e.g. cutter) are mounted on the arm (e.g. via the frame or body (e.g. the container) of the device). Thus the device may be embodied as, or comprise part of, a (e.g. automated) robot.

In a preferred embodiment the device comprises a position sensor to detect the (e.g. 3D) position of a piece of fruit to be picked. Preferably the position sensor comprises a camera and a (e.g. integral) depth sensor, e.g. a RGB-D camera or any other sensor able to detect the position of a piece of fruit. Preferably the position sensor (e.g. when it comprises a camera) is arranged to identify a ripe piece of fruit to be picked, e.g. using the colour of the piece of fruit (many pieces of fruit change colour when ripe, e.g. strawberries from green to red).

Preferably the data captured by the position sensor is used by (e.g. a control of) the device to position the device to be ready to pick a (e.g. ripe) piece of fruit. Thus preferably the data captured by the position sensor is used by the device to control the arm of the device to position the device to pick a (e.g. ripe) piece of fruit to be picked.

Preferably, e.g. in addition to the position sensor, the device comprises one or more distance sensors arranged on the inside of one or more of the plurality of locating members. Preferably the one or more distance sensors are mounted on the inside (e.g. concave) surface of the (e.g. active) locating members respectively.

The one or more distance sensors may comprise any suitable and desired type of sensor. In a preferred embodiment the one or more distance sensors comprise one or more infrared distance sensors.

Preferably the one or more distance sensors are arranged to detect the distance to a piece of fruit to be picked. Preferably the data captured by the one or more distance sensors is used by (e.g. a control of) the device to position the device to be ready to pick a piece of fruit and/or to control the size of the aperture defined by the plurality of locating members in the open position. Thus preferably the data captured by the position sensor is used by the device to control the arm of the device to position the device to pick a (e.g. ripe) piece of fruit to be picked.

Preferably the one or more distance sensors are arranged to provide fine tuning of the position of the device and/or the plurality of locating members around a piece of fruit to be picked, e.g. after the device has been positioned in the vicinity of the piece of fruit to be picked using the data captured by the position sensor. This helps to compensate for any errors in the position of the piece of fruit detected by the position sensor (e.g. that may not be able to be eliminated by the position sensor). The fine tuning also helps the device to pick pieces of fruit reliably, for different pieces of fruit that are, for example, different shapes, sizes, orientations and positions relative to other pieces of fruit on the fruit plant.

This positional control of the device and/or the plurality of locating members, using the data captured by the position sensor and/or the one or more distance sensors, helps to minimise the damage to the piece of fruit being picked. Indeed, in preferred embodiments the device may be operated such that the plurality of locating members do not come into contact with the piece of fruit to be picked, when the device is used to pick the piece of fruit.

It will also be appreciated that the positional control of the device and/or the plurality of locating members, using the data captured by the position sensor and/or the one or more distance sensors, helps to control the position on the stem of the piece of fruit at which the stem is cut, and in a preferred embodiment this is what is done. This helps to control (e.g. repeatedly for multiple pieces of fruit) the length of the stem that remains on the piece of fruit and/or on the fruit plant after the stem has been cut. Therefore, in a preferred embodiment the position sensor and/or the one or more distance sensors are used to control the three-dimensional position of the device and/or the plurality of locating members.

Preferably the data captured by the position sensor and/or the distance sensor(s) is used (e.g. by a control of the device) to determine when the piece of fruit has been picked. This helps to verify that the piece of fruit has been picked (e.g. the stem has been cut) successfully. For example, if the device determines that the piece of fruit has not been picked, the device may be repositioned and the detachment mechanism (e.g. cutter) operated (e.g. actuated) again to attempt to detach (e.g. cut the stem of) the piece of fruit.

In one embodiment the device comprises one or more sensors arranged to assess the quality of the piece of fruit that is to be or has been picked, e.g. by assessing the ripeness of the piece of fruit, the size of the piece of fruit, the presence (or lack) of any diseases or fungus on the piece of fruit, or any other characteristics of the piece of fruit as is suitable and desired. The one or more sensors are preferably positioned internally, e.g. on the inside of one or more of the plurality of locating members and/or on the inside of the container (where provided). This helps to enable the device to assess the quality of the piece of fruit, e.g. before the detachment mechanism detaches the piece of fruit from the fruit plant.

The detachment mechanism may be operated to detach the piece of fruit from the fruit plant based on the assessment of the piece of fruit to be picked by the one or more sensors. Preferably the device comprises a control arranged to receive data from (e.g. the output of) the one or more sensors and the control is arranged to control operation of the detachment mechanism based on the data received from the one or more sensors. Thus, for example, the control could operate the detachment mechanism to detach the piece of fruit from the fruit plant when the output from the one or more sensors indicates that the fruit is of sufficient quality (e.g. ripeness, size, lack of disease, etc.) to be picked or the control could prevent the detachment mechanism from detaching the piece of fruit from the fruit plant when the output from the one or more sensors indicates that the fruit is of insufficient quality (e.g. ripeness, size, diseased, etc.) and thus control the device to leave the piece of fruit on the fruit plant.

In one embodiment the device comprises one or more light sources (e.g. positioned internally, e.g. on the inside of one or more of the plurality of locating members and/or on the inside of the container (where provided)) that are arranged to illuminate the piece of fruit that is to be or has been picked, e.g. when the plurality of locating members are in the closed position (thus surrounding the piece of fruit). The one or more light sources help to control the lighting conditions (e.g. inside the device) and thus may help to allow the one or more sensors to assess the quality of the piece of fruit to be picked, thus allowing the device to decide whether or not to pick the piece of fruit or to leave it on the fruit plant.

An embodiment of the invention will now be described, by way of example only, with reference to the accompanying drawings, in which.

Soft fruit, such as strawberries, are high value crops which involve high production costs, particularly owing to the manual labour often involved. The manual picking of fruits introduces the risk of damaging the fruit as it is picked, which reduces the efficiency and profitability of the harvest. The present invention provides a device that is able to pick ripe, e.g., strawberries reliably and with minimal damage to the strawberries, while being able to separate out a ripe strawberry from other (e.g. non-ripe) strawberries in a cluster of fruit.

Figure 1:
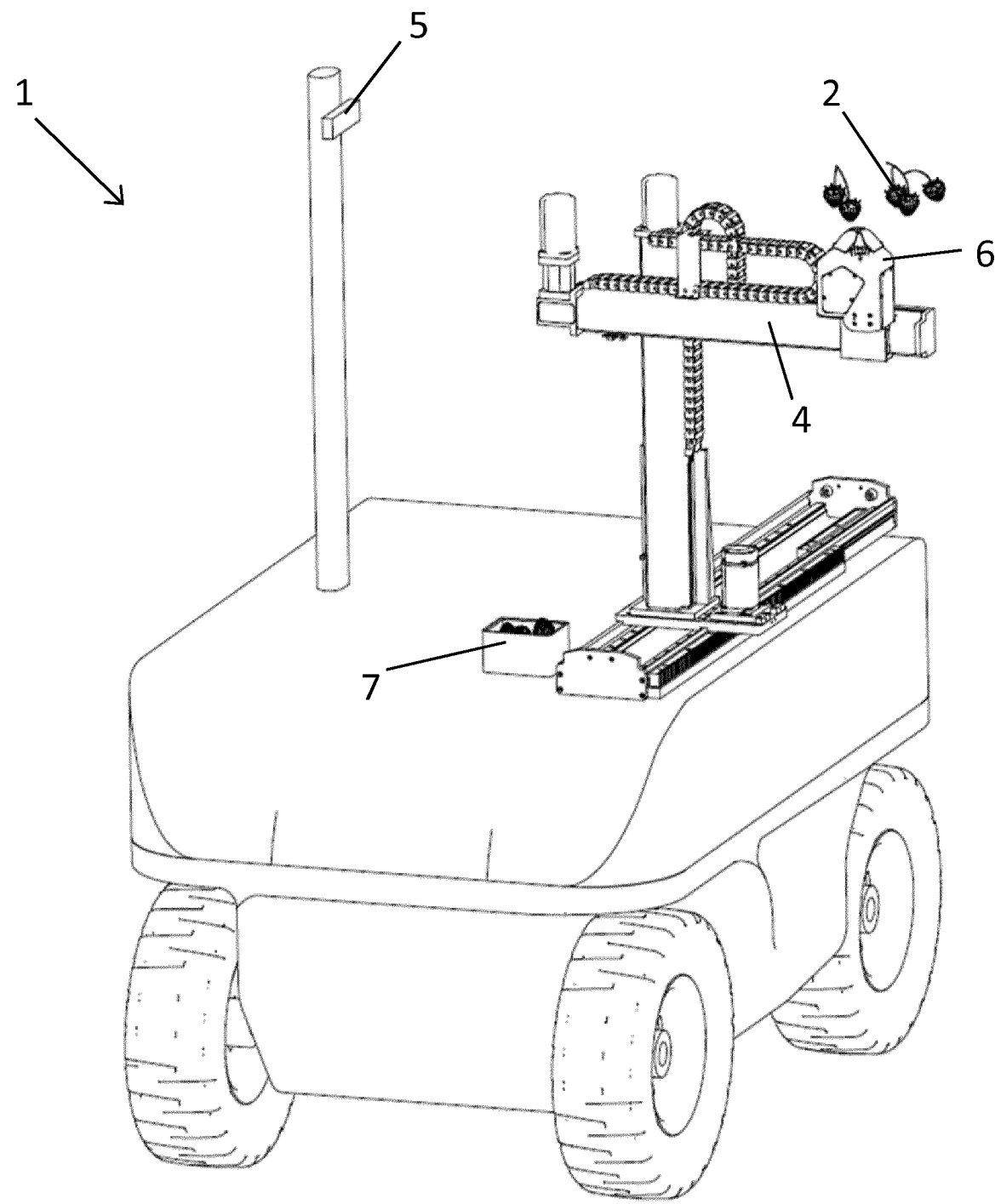
FIG. 1 shows a robot including a strawberry picking device according to an embodiment of the present invention.

FIG. 1 shows a robot 1 for picking strawberries 2 in accordance with an embodiment of the present invention. The robot 1 includes a manipulator arm 4 and an automated device 6 (attached to the manipulator arm 4) for picking and storing the strawberries 2. The robot 1 also includes an RGB-D camera 5 arranged to capture frames of image and depth data of strawberries 2 to be picked by the automated device 6. The frames of image and depth data captured by the RGB-D camera 5 are used by the robot 1 to control the manipulator arm 4 to position the device 6 next to a strawberry 2 to be picked, as will be described in more detail below. The robot 1 also has a platform for a collection tray 7 into which the strawberries 2 picked by the device 6 may be stored.

Figure 2A:
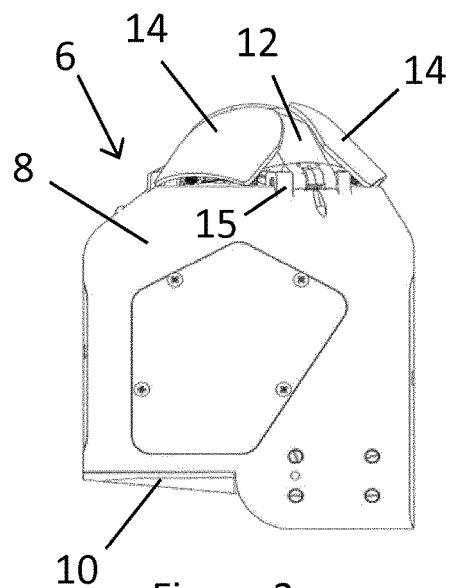
FIGS. 2a, 2b, 2c, 2d, 2e, 2f and 2g show different views of a strawberry picking device according to an embodiment of the present invention.
Figure 2B:
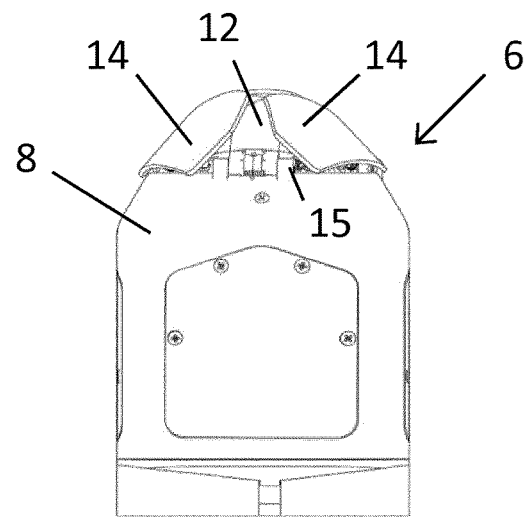
Figure 2C:
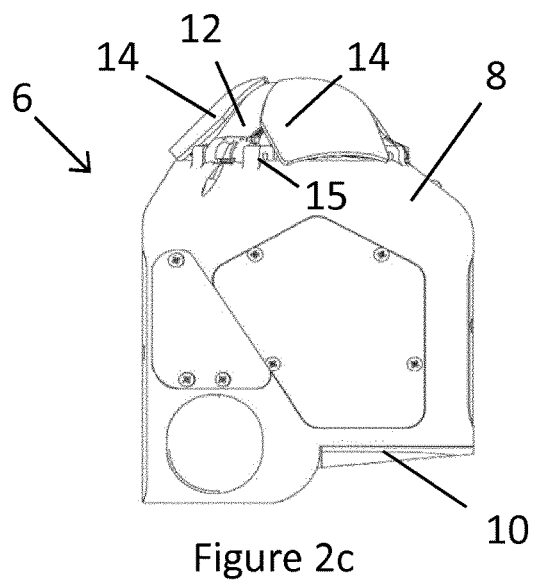
Figure 2D:
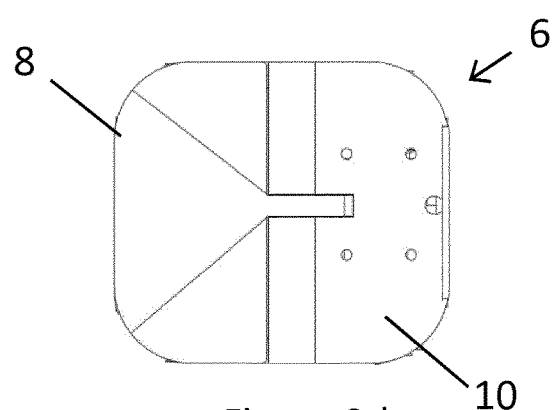
Figure 2E:
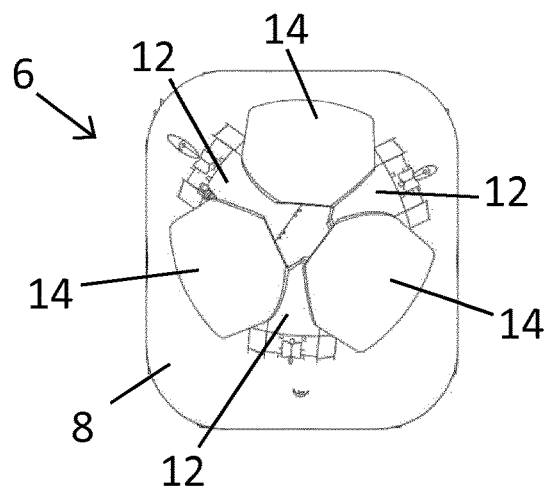
Figure 2F:
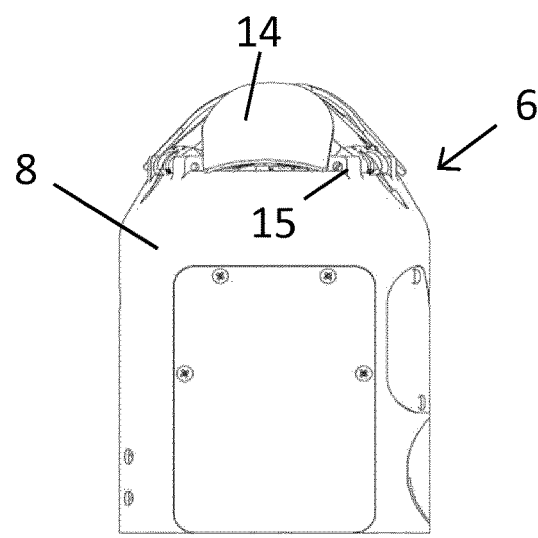
Figure 2G:
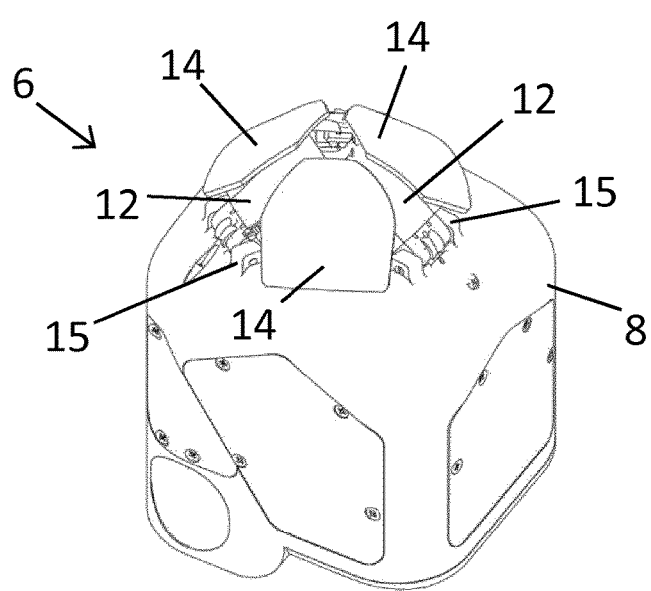

FIGS. 2a-2g show the automated device 6 (shown as not being attached to the robot 1 via the manipulator arm 4 solely for the purpose of clarity) for picking strawberries 2 in accordance with an embodiment of the present invention. FIG. 2a shows a right side view of the device 6, FIG. 2b shows a front view of the device 6, FIG. 2c shows a left side view of the device 6, FIG. 2d shows an underneath view of the device 6, FIG. 2e shows a top view of the device 6, FIG. 2f shows a rear view of the device 6 and FIG. 2g shows a perspective view of the device 6 from above.

The device 6 is mounted on the manipulator arm 4 of the robot 1, as shown in FIG. 1, so that it is able to approach and pick strawberries 2. The device 6 includes a main body 8 having side walls that define a hollow container (for storing picked strawberries 2) and on which other parts of the device 6 are mounted, as will be described.

The main body 8 has an opening at the top for receiving strawberries 2 that are to be picked and an opening at the base for dispensing strawberries 2 that have been picked and stored. The opening at the base of the main body 8 is covered by a trapdoor 10 that is hingedly mounted to the main body 8 and can be opened to dispense strawberries 2.

Six overlapping curved locating plates 12, 14 are hingedly mounted to the main body 8 around the edge of the opening at the top of the main body 8 via respective hinges 15. The locating plates 12, 14 are arranged to move between a closed state (e.g. as shown in FIGS. 2a, 2b, 2c, 2e, 2f and 2g) in which the locating plates 12, 14 substantially close the opening at the top of the main body 8 (but still define a small aperture between the distal ends of the locating plates 12, 14) and an open state (e.g. as shown in FIGS. 3 and 4) in which the locating plates 12, 14 are moved to a substantially vertical orientation that allows access for a strawberry past the locating plates 12, 14 and through the opening in the top of the main body 8 into the volume inside the main body 8 (when strawberries 2 are being picked, the trapdoor 10 remains closed).

The three inner locating plates 12 are driven and the alternate three outer locating plates 14 are passive, such that the outer locating plates 14 follow the movement of the inner locating plates 12. The inner locating plates 12 are driven by a cable mechanism that may be actuated to open the locating plates 12, 14. The overlap of the inner and outer locating plates 12, 14 means that when the inner locating plates 12 are driven open, the outer locating plates 14 are also opened by the movement of the inner locating plates 12 on which they rest.

The cable mechanism acts against the force exerted by four tension springs 16 that are connected between each pair of the inner and outer locating plates 12, 14. The cable mechanism also acts against the force exerted by three torsion springs 17 that are located in the respective hinges of the three inner locating plates 12 (as can be seen in FIG. 3). The tension springs 16 and the torsion springs 17 thus act to close the locating plates 12, 14 after they have been opened by the cable mechanism. The tension springs 16 also act to keep the outer locating plates 14 in contact with the inner locating plates 12, regardless of their orientation.

Figure 3:
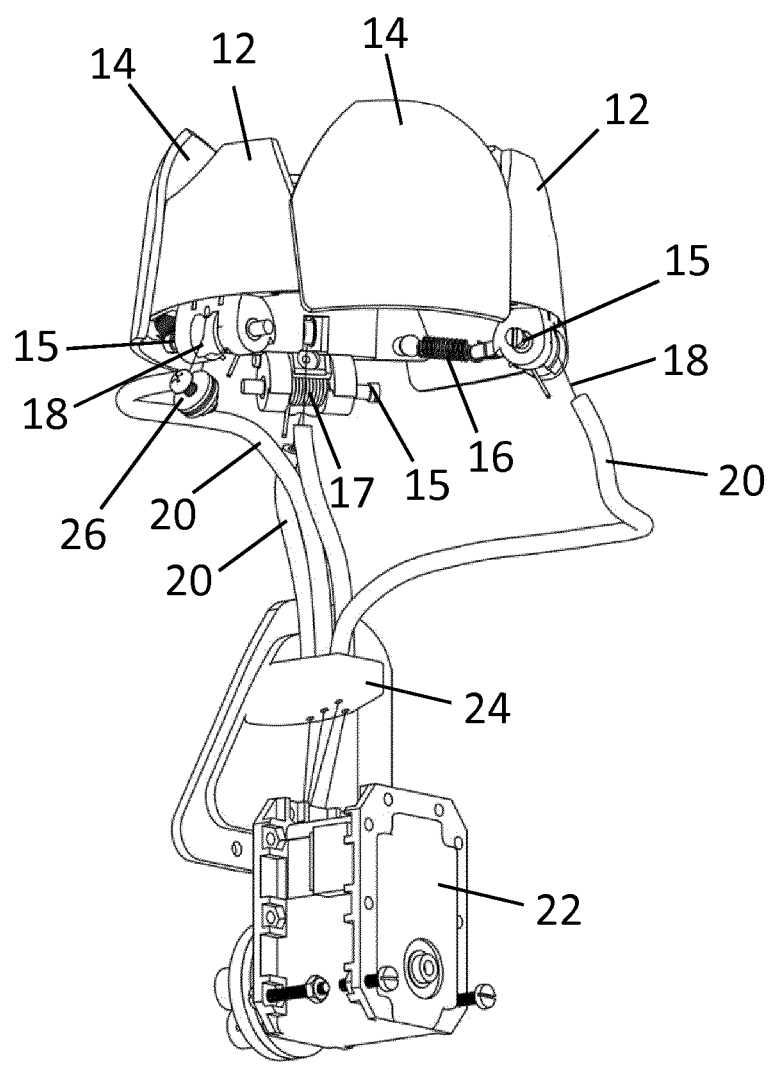
FIG. 3 shows the inner workings of the strawberry picking device shown in FIGS. 2a-2g.
Figure 4:
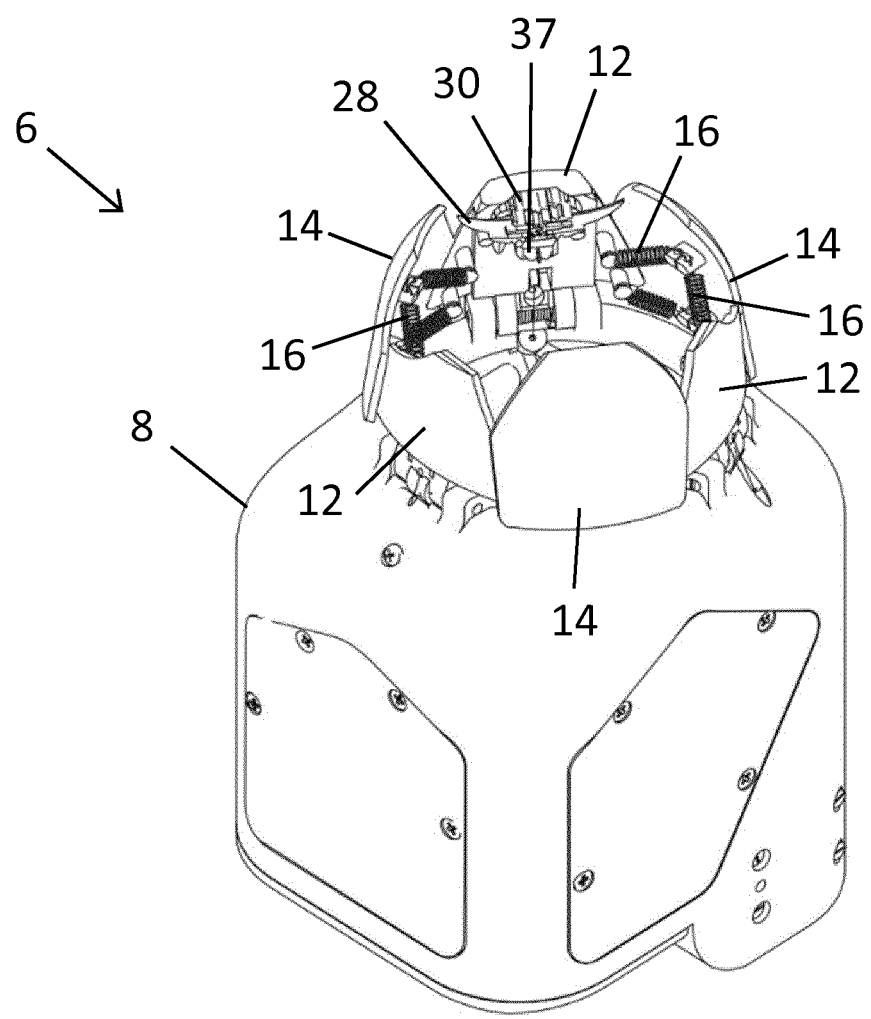
FIG. 4 shows a perspective view of the strawberry picking device shown in FIGS. 2a-2g.

FIG. 3 shows the cable mechanism attached to the inner locating plates 12 (as shown with the main body 8 of the automated device 6 removed for the purposes of clarity). The cable mechanism includes three flexible steel cables 18 (each covered by a respective protective sheath 20) attached to the three driven inner locating plates 12 respectively at one end and a rotating motor 22 at their other end. The cables 18 pass from the motor 22 to the inner locating plates 12 via a frame 24 that locates and guides the cables 18, and via a pulley 26. The cables 18, when retracted by the motor 22, act to rotate the inner locating plates 12 about their respective hinges 15 to open the inner and outer locating plates 12, 14.

FIG. 4 shows a perspective view of the automated picking device 6 with the inner and outer locating plates 12, 14 open. This reveals a pair of cutters 28 that is attached to the inner surface of one of the inner locating plates 12 by a pair of meshing gears 30. The cutters 28 have a pair of opposing curved blades that are arranged to cut the stem of a strawberry 2, so to separate the strawberry 2 from the plant. The cutters 28 are actuated by a cable 32 that is retracted by the same motor 22 that opens and closes the inner and outer locating plates 12, 14.

Figure 5:
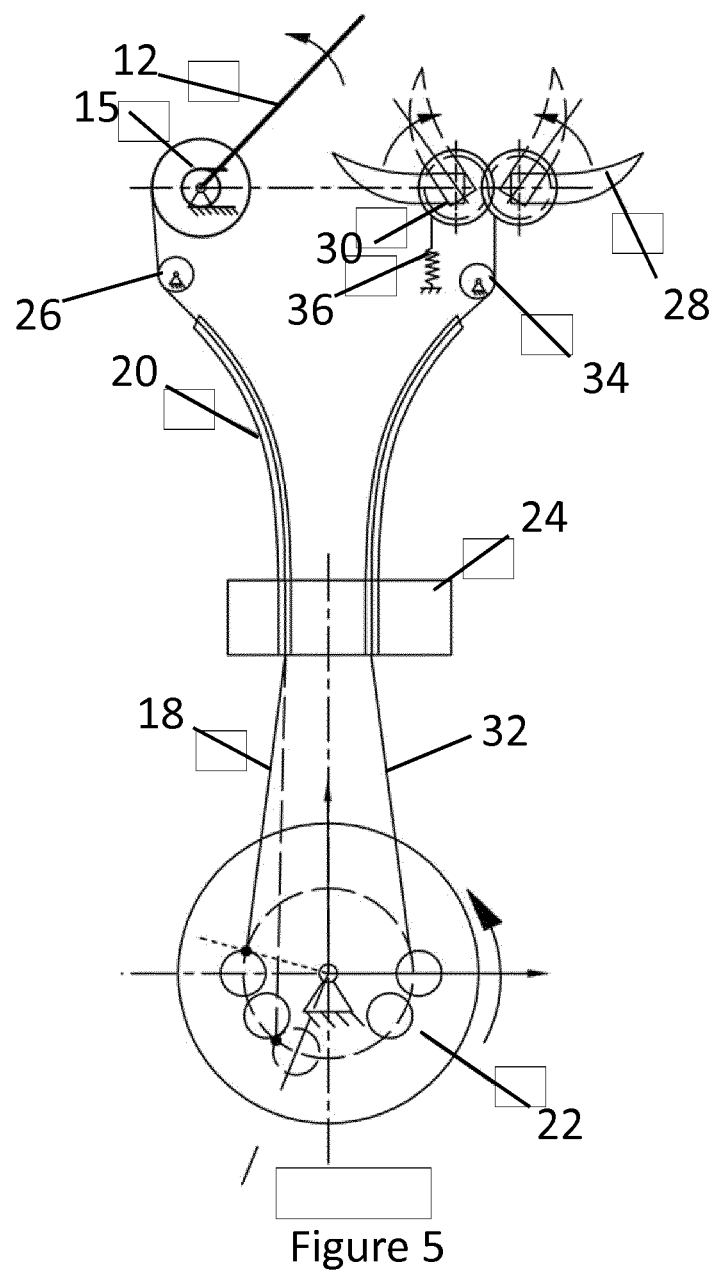
FIG. 5 shows schematically an actuation mechanism of the strawberry picking device shown in FIGS. 2a-2g.

FIG. 5 shows schematically the motor 22 and the cables 18, 32 that connect the motor 22 to the inner locating plates 12 and the pair of cutters 28 respectively. The cable 32 connecting the motor 22 to the pair of cutters 28 (via a pulley 34 and the meshing gears 30) is retracted by the motor 22 rotating in the opposite direction (clockwise as shown in FIG. 5), in order to move the blades of the cutters 28 together, compared to the direction (anti-clockwise as shown in FIG. 5) in which the motor 22 is rotated in order to open the inner locating plates 12. A tension spring 36 is connected to the meshing gears 30 which biases the pair of cutters 28 open, and against which the cable mechanism acts to close the pair of cutters 28.

Figure 6A:
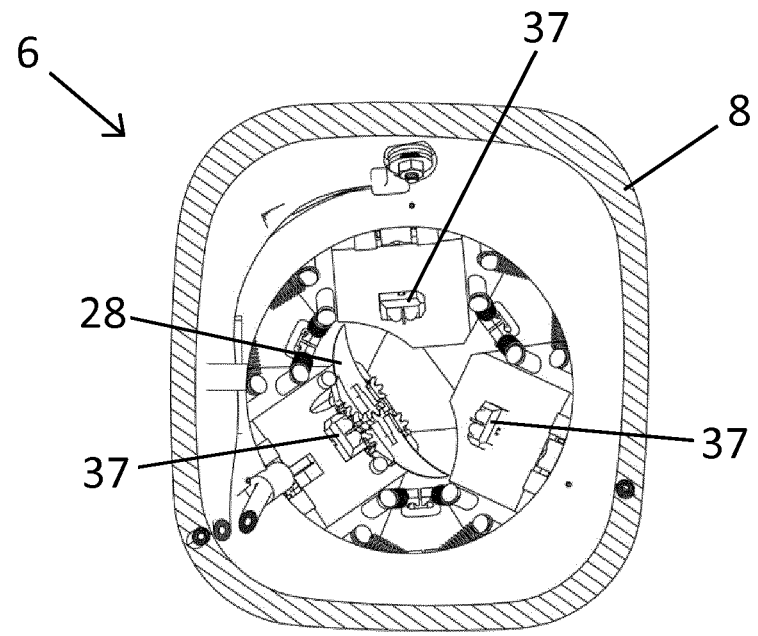
FIGS. 6a and 6b show cross-sectional views of the strawberry picking device shown in FIGS. 2a-2g.
Figure 6B:
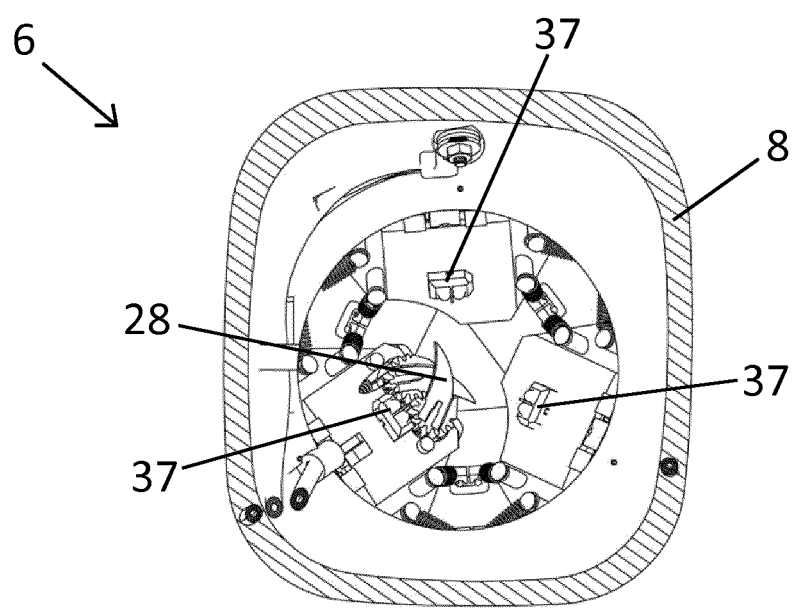

FIG. 6a shows a cross-sectional view up through the device 6 when the pair of cutters 28 is open and FIG. 6b shows a sectional view up through the device 6 when the pair of cutters 28 is closed.

As can be seen from FIGS. 6a and 6b (and also partly in FIG. 4), a distance sensor 37 is located on the inner surface of each of the inner locating plates 12. The distance sensor 37 provides feedback (e.g. to a control of the robot 1) so that the manipulator arm 4 to which the automated picking device 6 is attached can be positioned (both horizontally and vertically) relative to a strawberry 2, such that the strawberry 2 is located centrally with respect to the inner and outer locating plates 12, 14 and at the appropriate vertical position with respect to the pair of cutters 28.

Figure 7:
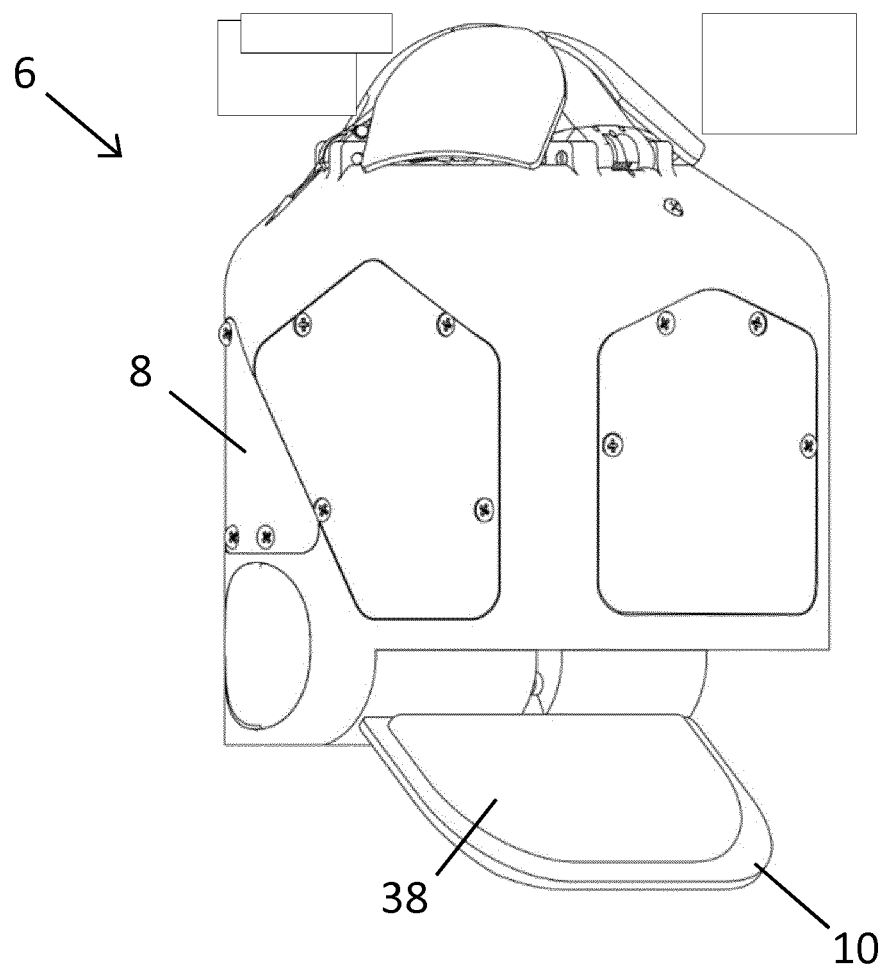
FIG. 7 shows a side view of the strawberry picking device shown in FIGS. 2a-2g.

FIG. 7 shows a side view of the automated picking device 6 with its trapdoor 10 open. This shows that the inner surface of the trapdoor is covered with a soft sponge 38. The sponge 38 acts to cushion strawberries 2 after they have been cut by the pair of cutters 28 from the strawberry plant and they fall into the main body 8 of the automated picking device 6.

Figure 8A:
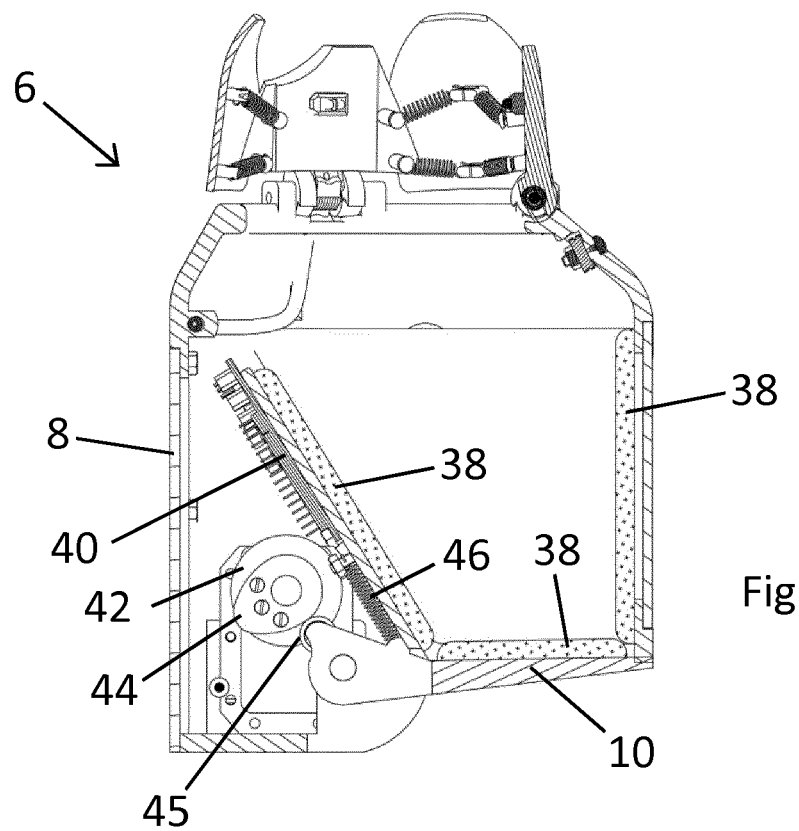
FIGS. 8a and 8b show cross-sectional views of the strawberry picking device shown in FIGS. 2a-2g.
Figure 8B:
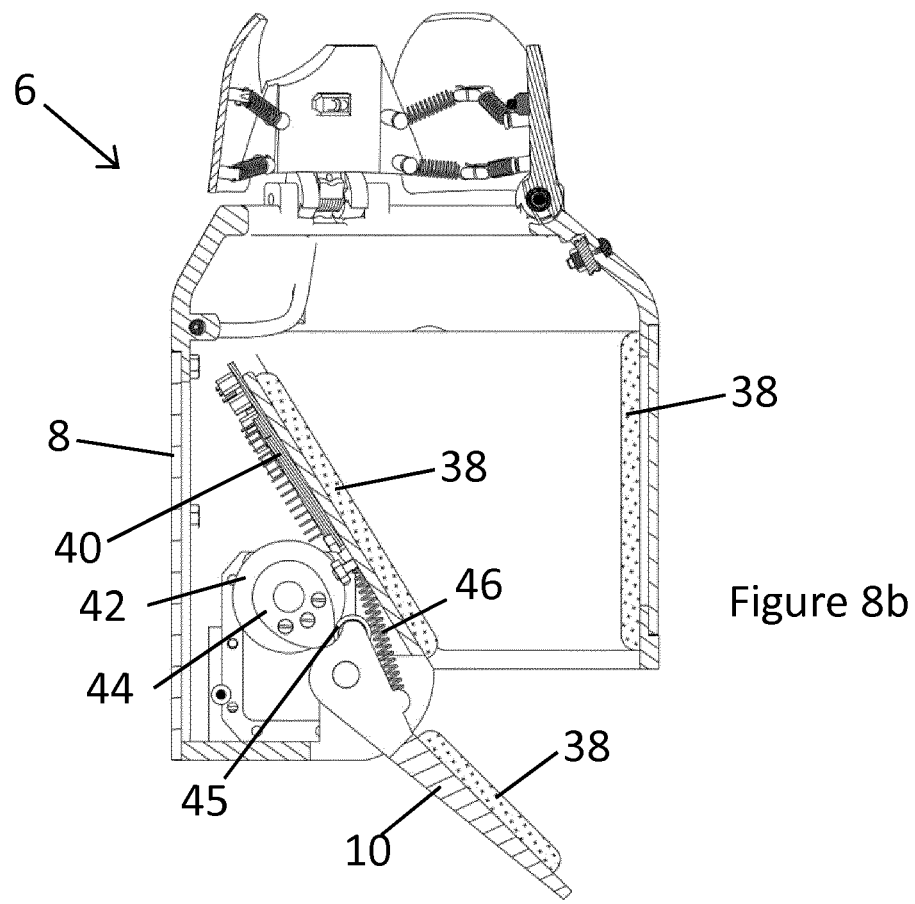

FIGS. 8a and 8b show side cross-sectional views of the automated picking device 6. FIG. 8a shows the trapdoor 10 closed and FIG. 8b shows the trapdoor 10 open in the same configuration as shown in FIG. 7.

As can be seen from FIGS. 8a and 8b, as well as a soft sponge covering 38 being provided on the inner surface of the trapdoor 10, the inner surface of the side walls of the main body 8 of the automated picking device 6 is also covered with a soft sponge 38. An inclined dropping board 40 is provided in the interior volume of the main body 8 of the automated picking device 6. The inclined dropping board 40 is designed to break the fall of strawberries 2 after they have been cut by the pair of cutters 28 from the strawberry plant. The inclined dropping board 40 is therefore also covered with a soft sponge 38. The soft sponge coverings 38 are removable so that they can be disassembled for washing or replacement after use.

Figure 9A:
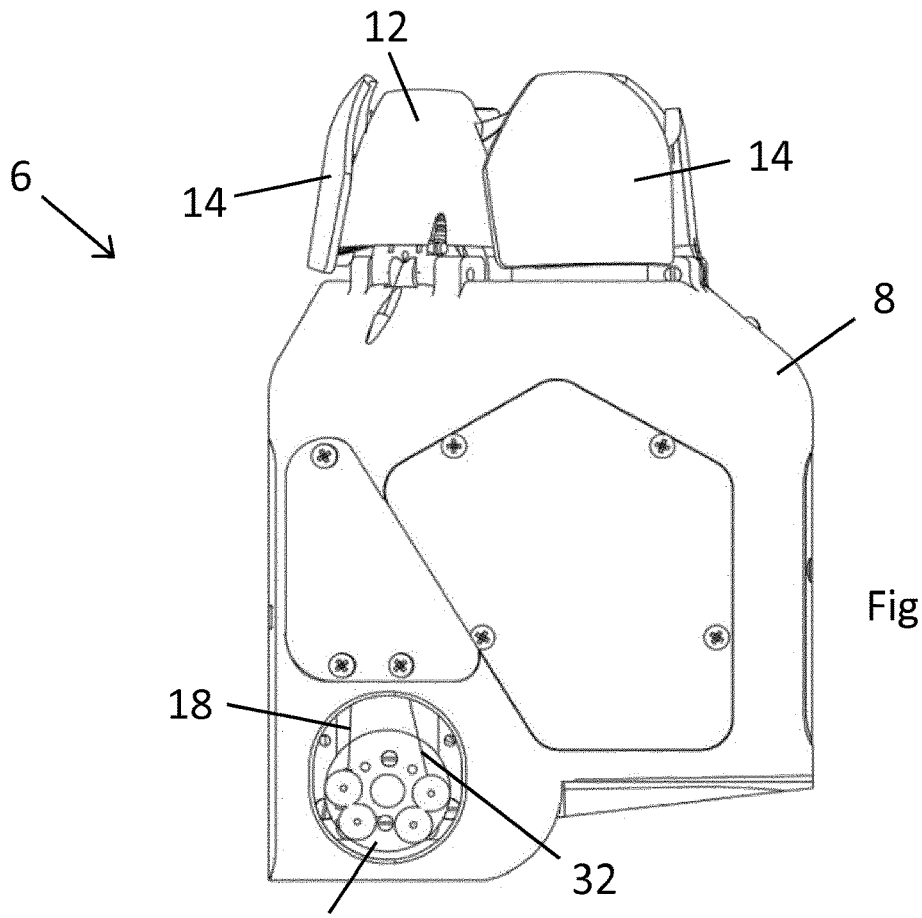
FIGS. 9a and 9b show side and rear views of the strawberry picking device shown in FIGS. 2a-2g.
Figure 9B:
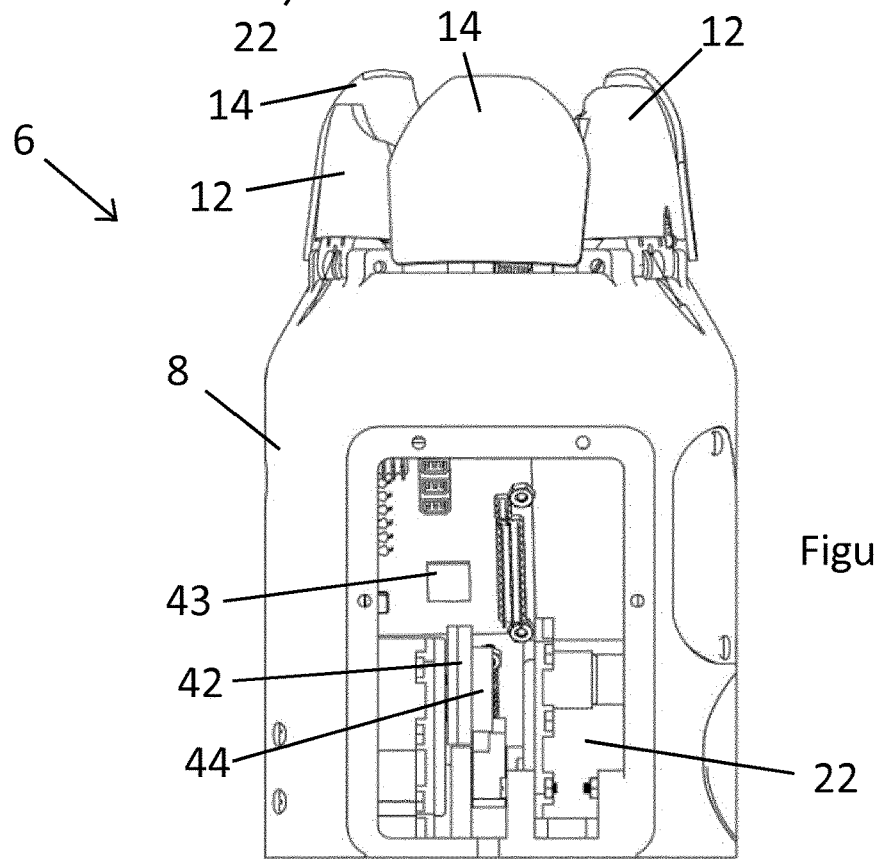

FIGS. 8a and 8b also show the actuation mechanism for opening and closing the trapdoor 10 of the automated picking device 6. FIGS. 9a and 9b show a left side view and a rear view respectively of the automated picking device 6 in which part of the respective side walls of the main body 8 of the automated picking device 6 have been removed so that part of the actuation mechanism (and part of the cable mechanism) can also be seen.

The actuation mechanism for opening and closing the trapdoor 10 of the automated picking device 6 is driven by a motor 42. The motor 42 of the actuation mechanism is separate from, but positioned next to (underneath the inclined dropping board 40) the motor 22 that drives the cable mechanism, as can be seen in FIGS. 8a, 8b and 9b.

As can also be seen in FIG. 9b, a controller 43 is located on the inner wall of the main body 8 of the automated device 6 underneath the inclined dropping board 40. The controller 43 controls the operation of the actuation and cable mechanisms, e.g. using the feedback from the distance sensors 37.

A rotating cam 44 is mounted to the motor 42 of the actuation mechanism, with the motor 42 arranged to rotate the cam 44. The cam 44 is in contact with the trapdoor 10 (via a roller bearing 45), which is rotatably mounted to the main body 8 of the automated picking device 6. The cam 44 is configured, when the cam 44 is rotated by the motor 22, to open the trapdoor 10, as shown in FIG. 8b.

The rotation of the cam 44 (anti-clockwise as shown in FIGS. 8a and 8b) and the trapdoor 10 opening act against a tension spring 46, connected between the trapdoor 10 and the inclined dropping board 40, which acts to close the trapdoor 10 when the cam 44 rotates in the opposite direction (clockwise, as shown in FIGS. 8a and 8b). The tension spring 46 retains the trapdoor 10 closed until the actuation mechanism is energised to open the trapdoor 10.

Figure 14:
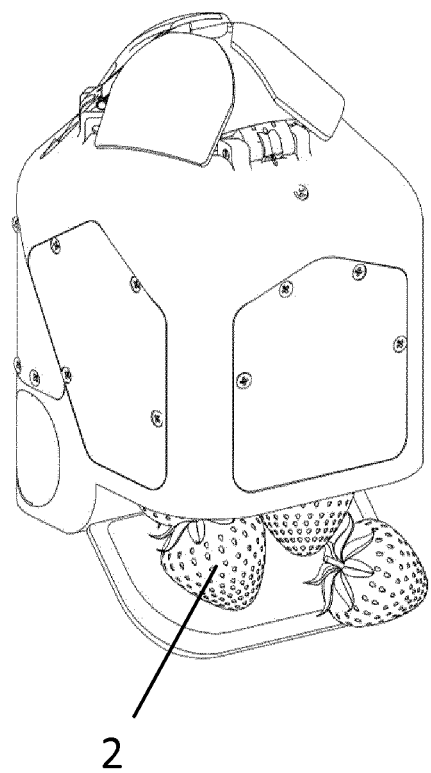
FIG. 14 shows a perspective view of the strawberry picking device shown in FIGS. 2a-2g in operation.

Operation of the automated picking device 6 to pick strawberries 2 will now be described with reference to FIGS. 1-9b, as well as with reference to FIGS. 10a-14. FIGS. 10a, 10b, 10c, 11a, 11b, 11c, 12a, 12b, 12c, 13a, 13b and 13c show the automated picking device 6 being used to pick a strawberry 2. FIG. 14 shows the automated picking device 6 being used to dispense strawberries 2 that have been picked and stored by the automated picking device 6.

Figure 10A:
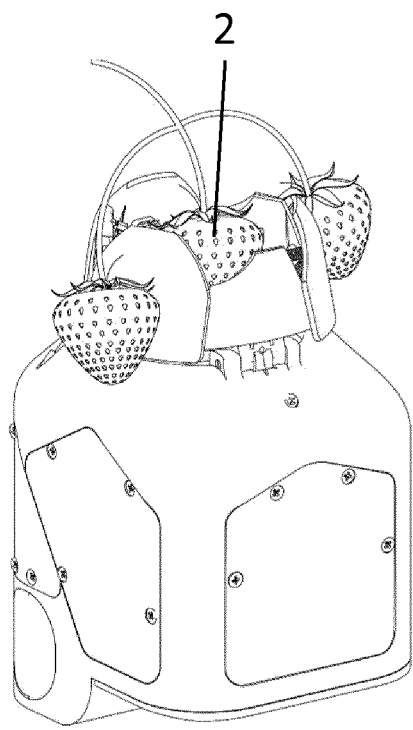
FIGS. 10a, 10b and 10c show perspective, top and cross-sectional views respectively of the strawberry picking device shown in FIGS. 2a-2g in operation.
Figure 10B:
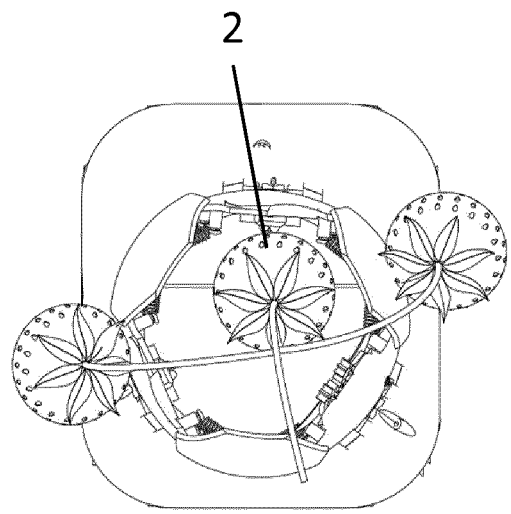
Figure 10C:
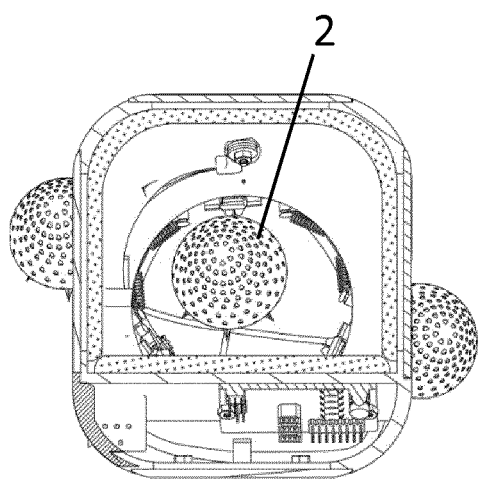

FIG. 10a shows a perspective view of the automated picking device 6 in operation, FIG. 10b shows a top view of the automated picking device 6 in operation and FIG. 10c shows a cross-sectional view from below of the automated picking device 6 in operation. FIGS. 11a-11c, 12a-12c and 13a-13c each show the same views as in FIGS. 10a-10c at different respective stages of operation of the automated picking device 6. FIG. 14 shows a perspective view of the automated picking device 6.

First, the robot 1 is positioned next to a strawberry plant on which there are ripe strawberries 2 to be picked, as shown in FIG. 1. The RGB-D camera 5 is used to capture image and depth data of the strawberry plant. The data captured by the RGB-D camera 5 is processed by a main controller (e.g. on a laptop computer (not shown)) to identify the 3-D position of a ripe strawberry 2. The main controller uses the image data captured to identify a ripe strawberry 2 from its colour. The main controller uses the depth data captured, along with the captured image to determine the 3-D position of the ripe strawberry 2.

The determined 3-D position of the ripe strawberry 2 to be picked is used by the controller 43 to instruct the manipulator arm 4 of the robot 1 to move the device 6 such that it is positioned below the ripe strawberry 2 to pick, i.e. in the position shown in FIGS. 10a, 10b and 10c. The motor 22 is also energised to rotate (anticlockwise as shown in FIG. 5) to open the locating plates 12, 14 into the open position shown in FIGS. 10a, 10b and 10c.

With the ripe strawberry 2 to be picked in the position relative to the device 6 shown in FIGS. 10a, 10b and 10c, the distance sensors 37 mounted on the inner surface of the inner locating plates 12 detect the distances of the strawberry 2 from the respective distance sensors 37. The distance data captured by the distance sensors 37 is used by the controller 43 to determine the position of the strawberry 2 in the aperture defined by the locating plates 12, 14.

Figure 11A:
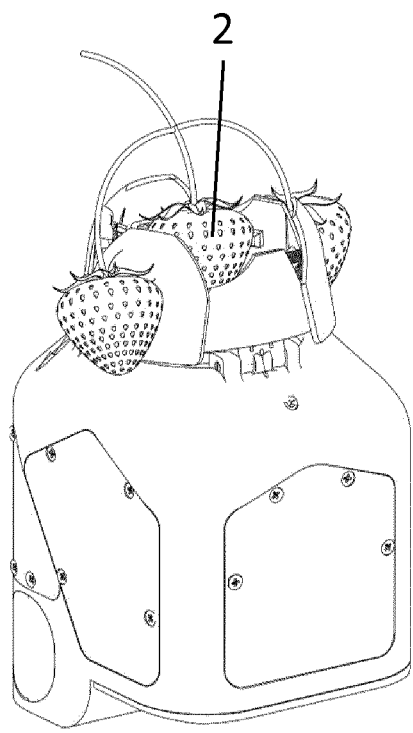
FIGS. 11a, 11b and 11c show perspective, top and cross-sectional views respectively of the strawberry picking device shown in FIGS. 2a-2g in operation.
Figure 11B:
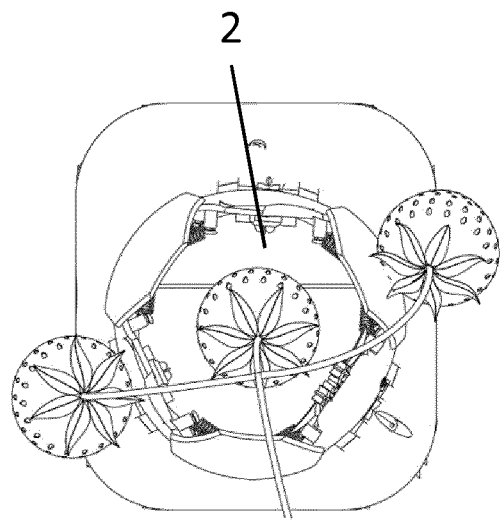
Figure 11C:
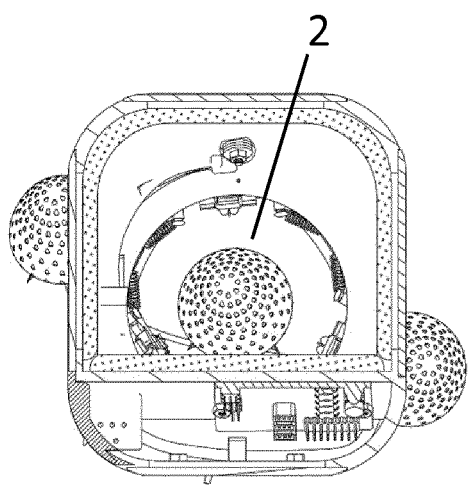
Figure 12A:
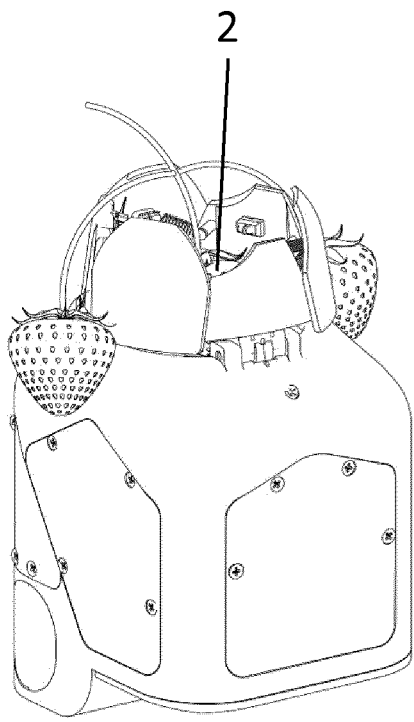
FIGS. 12a, 12b and 12c show perspective, top and cross-sectional views respectively of the strawberry picking device shown in FIGS. 2a-2g in operation.
Figure 12B:
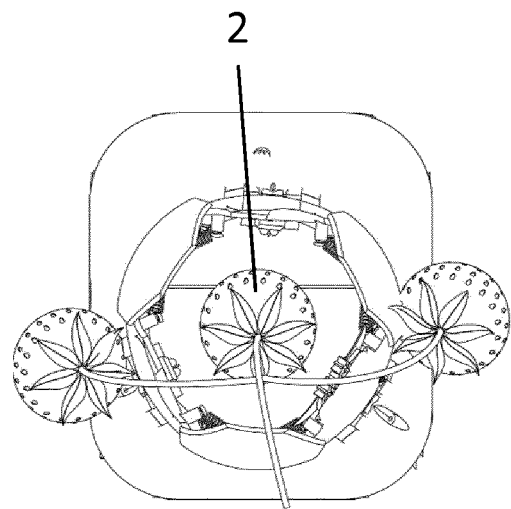
Figure 12C:
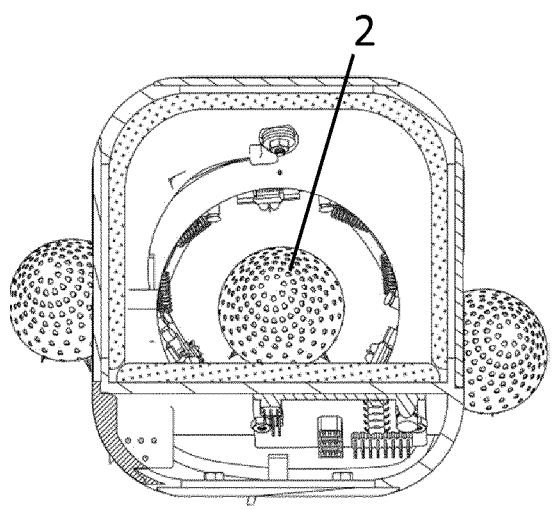
Figure 13A:
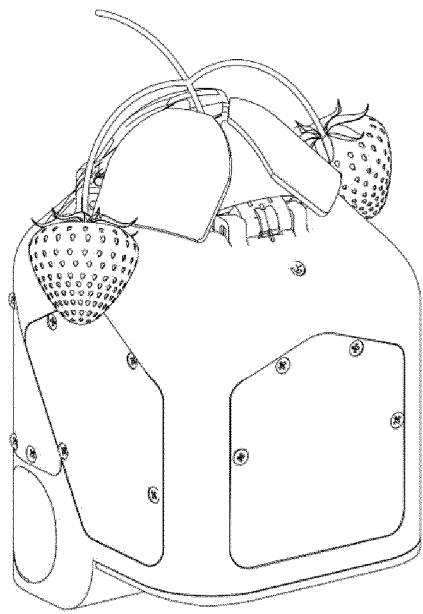
FIGS. 13a, 13b and 13c show perspective, top and cross-sectional views respectively of the strawberry picking device shown in FIGS. 2a-2g in operation.
Figure 13B:
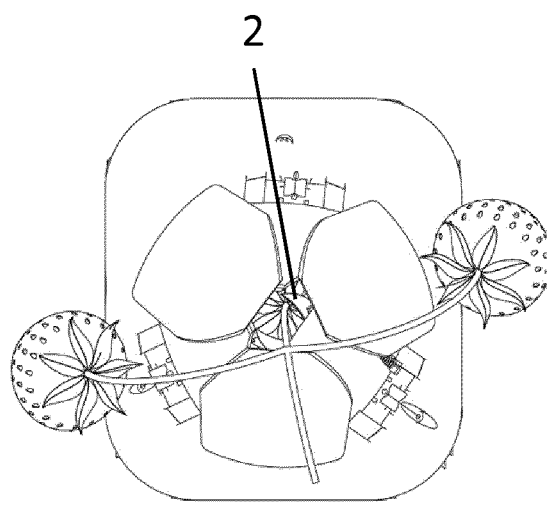
Figure 13C:
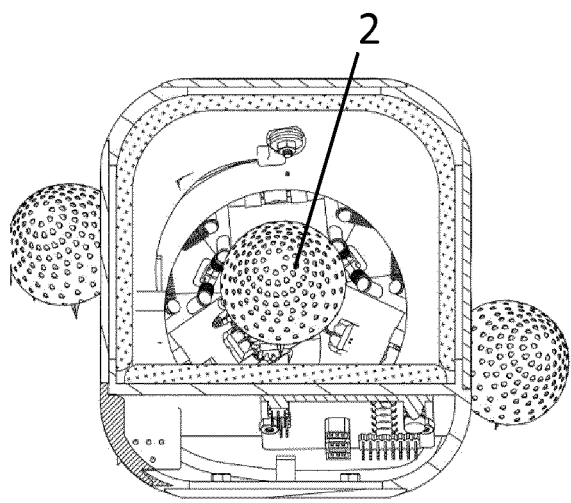

As can be seen in FIGS. 10b and 10c, the device 6 has been positioned relative to the strawberry 2 to be picked with the strawberry 2 slightly off-centre in the aperture defined by the locating plates 12, 14. The position of the strawberry 2, determined by the controller 43 from the distance data captured by the distance sensors 37, is used by the controller 43 to instruct the manipulator arm 4 of the robot 1 to move the device 6 such that the strawberry 2 to be picked is centred in the aperture defined by the locating plates 12, 14, as shown in FIGS. 11a, 11b and 11c. The position of the strawberry 2, determined by the controller 43 from the distance data captured by the distance sensors 37, may also be used to fine tune the position of the locating plates 12, 14 (e.g. dependent on the size of the strawberry 2 to be picked).

With the strawberry 2 to be picked is centred in the aperture defined by the locating plates 12, 14, the device is moved upwards (into the position shown in FIGS. 12a, 12b and 12c) so that the stem of the strawberry 2 to be picked is in a position to be cut by the pair of cutters 28. Again, this uses the position of the strawberry 2, as determined by the controller 43 from the distance data captured by the distance sensors 37.

Once the device 6 is in this position, the motor 22 is energised to rotate in the opposite direction (clockwise as shown in FIG. 5) to allow the locating plates 12, 14 to close under the bias of the tension springs 16 and the torsion springs 17. This moves the locating plates 12, 14 into the position shown in FIGS. 13a, 13b and 13c, with the distal ends of the locating plates 12, 14 forming a small aperture around the stem of the strawberry 2 to be picked.

It will be appreciated that if the device 6 is not been positioned with the strawberry 2 to be picked at the centre of the aperture, the distal ends of the locating plates 12, 14, as they are moved into the closed position, will come into contact with the stem of the strawberry 2 to be picked, so to move it with a few millimetres of the centre of the aperture.

With the device 6 in this configuration, the motor 22 is energised to rotate further in the clockwise direction (as shown in FIG. 5). This actuates the pair of cutters 28 to cut the stem of the strawberry 2. The strawberry 2 falls into the container defined by the hollow body 8 of the device 6. The fall of the strawberry 2 is cushioned by the sponges 38 on the walls of the body 8 of the device 6 and is retained therein.

The process of identifying and picking the strawberry 2, as outlined above, may then be repeated for other ripe strawberries on the strawberry plant, until the device 6 has reached its storage capacity. Once the device 6 is full with picked strawberries, the manipulator arm 4 moves the device 6 so that it is above a collection tray and the trapdoor motor is energised to open the trapdoor 10 (as shown in FIG. 8b. This dispenses the strawberries 2 from the device, as shown in FIG. 14.

The device 6 may then be used to pick another set of strawberries, in the manner outlined above.

As can be seen from the above, at least in preferred embodiments, the invention provides a fruit picking device that, owing to its separation of the locating function of the locating members from the cutting function of the cutter, is less likely to damage the piece of fruit when it is being picked. Furthermore, the plurality of locating members of the device according to the present invention help to carefully separate out a single piece of fruit from a cluster of pieces of fruit (e.g. on a strawberry plant). This helps to only cut pieces of fruit that have been identified as being ripe and not to cut unripe pieces of fruit accidentally at the same time. The locating members also help to position the stem of the piece of fruit (which may be difficult to detect, e.g. on a strawberry plant) as they move to their closed position, such that the stem is in the correct position to be cut by the cutter. These features all help to provide a fruit picking device that is able to reliably and efficiently pick pieces of fruit with minimal damage to the pieces of fruit.

The invention claimed is:

1. A device for picking a piece of fruit from a fruit plant, wherein the piece of fruit is attached to the fruit plant by a stem, the device comprising:
   a frame or body;
   a plurality of locating members arranged to be positioned around a piece of fruit to be picked, wherein each of the plurality of locating members comprises a proximal end, hingedly attached to the frame or body, and a distal end, wherein the proximal end is wider than the distal end, and wherein the plurality of locating members are actuatable from an open position to receive the piece of fruit between the plurality of locating members to a closed position to surround the stem by which the piece of fruit is attached to the fruit plant; and
   a mechanism for detaching the piece of fruit to be picked from the fruit plant, wherein the mechanism is mounted on or relative to one or more of the plurality of locating members, and wherein the mechanism is arranged to detach the piece of fruit from the plant when the plurality of locating members are in the closed position;
   wherein the plurality of locating members comprises a plurality of inner locating members and a plurality of outer locating members, such that each outer locating member of the plurality of outer locating members at least partially overlaps with two adjacent inner locating members of the plurality of inner locating members.

2. The device as claimed in claim 1, wherein the plurality of locating members are arranged in a ring.

3. The device as claimed in claim 1, wherein the plurality of locating members each comprise a locating plate.

4. The device as claimed in claim 1, wherein the device comprises an actuation mechanism arranged to actuate the plurality of locating members between the closed position and the open position, and wherein the plurality of locating members comprise one or more active locating members and wherein the actuation mechanism is arranged to actuate the one or more active locating members between the closed position and the open position; and wherein the plurality of locating members comprise one or more passive locating members, wherein the one or more active locating members are arranged to actuate the one or more passive locating members between the closed position and the open position.

5. The device as claimed in claim 1, wherein the device comprises a return mechanism arranged to actuate the plurality of locating members between the open position and the closed position, wherein the return mechanism comprises a biasing mechanism arranged to bias the plurality of locating members into the closed position.

6. The device as claimed in claim 1, wherein the detachment mechanism is arranged to be moved into a detaching position for detaching the piece of fruit when the plurality of locating members are in, or have been moved into, the closed position, and wherein the detachment mechanism is arranged to detach the piece of fruit from the plant when the detachment mechanism has been moved into the detaching position.

7. The device as claimed in claim 6, wherein the device comprises a return mechanism arranged to actuate the plurality of locating members between the open position and the closed position, and wherein the detachment mechanism is arranged to be moved into the detaching position by the return mechanism.

8. The device as claimed in claim 1, wherein the detachment mechanism is mounted on or relative to an inner surface of the one of the plurality of locating members.

9. The device as claimed in claim 1, wherein one or more of the plurality of locating members is arranged to shield the detachment mechanism from the piece of fruit to be picked.

10. The device as claimed in claim 1, wherein the detachment mechanism comprises a cutter for cutting the stem of the piece of fruit to be picked, and wherein the cutter comprises a pair of opposing blades.

11. The device as claimed in claim 10, wherein the device comprises a cutter actuation mechanism arranged to actuate the cutter to cut the stem of the piece of fruit to be picked.

12. The device as claimed in claim 11, wherein the device comprises an actuation mechanism arranged to actuate the plurality of locating members between the closed position and the open position, and wherein the device comprises a motor arranged to drive the cutter actuation mechanism and the actuation mechanism for the plurality of locating members, and wherein the motor is arranged to be driven in a first direction to drive the actuation mechanism for the plurality of locating members and is arranged to be driven in a second, opposite direction to drive the cutter actuation mechanism.

13. The device as claimed in claim 1, wherein the device comprises an integral container for receiving and storing the piece of fruit that has been picked.

14. The device as claimed in claim 13, wherein the container comprises a trapdoor arranged to be opened to dispense the piece(s) of fruit that have been picked by the device.

15. The device as claimed in claim 1, wherein the device comprises a position sensor to detect the position of the piece of fruit to be picked, wherein data captured by the position sensor is used by the device to position the device to be ready to pick the piece of fruit.

16. The device as claimed in claim 1, wherein the device comprises one or more distance sensors arranged on an inside of one or more of the plurality of locating members, wherein data captured by the one or more distance sensors is used by the device to position the device to be ready to pick the piece of fruit and/or to control the size of the aperture defined by the plurality of locating members in the open position and/or to verify that the piece of fruit has been picked successfully.

17. A method of picking a piece of fruit from a fruit plant using a device for picking a piece of fruit from a fruit plant in which the piece of fruit is attached to the fruit plant by a stem, the device comprising:
   a frame or body;
   a plurality of locating members arranged to be positioned around a piece of fruit to be picked, wherein each of the plurality of locating members comprises a proximal end, hingedly attached to the frame or body, and a distal end, wherein the proximal end is wider than the distal end, and wherein the plurality of locating members are actuatable from an open position to receive the piece of fruit between the plurality of locating members to a closed position to surround the stem by which the piece of fruit is attached to the fruit plant; and
   a mechanism for detaching the piece of fruit to be picked from the fruit plant, wherein the mechanism is mounted on or relative to one or more of the plurality of locating members, and wherein the mechanism is arranged to detach the piece of fruit from the plant when the plurality of locating members are in the closed position, and wherein the plurality of locating members comprises a plurality of inner locating members and a plurality of outer locating members, such that each outer locating member of the plurality of outer locating members at least partially overlaps with two adjacent inner locating members of the plurality of inner locating members;

the method comprising:

actuating the plurality of locating members into the open position;

positioning the device around a piece of fruit to be picked so that the plurality of locating members in the open position receive the piece of fruit between the plurality of locating members;

actuating the plurality of locating members into the closed position to surround the stem by which the piece of fruit is attached to the fruit plant; and operating the mechanism when the plurality of locating members are in the closed position to detach the piece of fruit from the fruit plant.

* * * * *